(12) United States Patent
Lu et al.

(10) Patent No.: US 10,634,279 B2
(45) Date of Patent: Apr. 28, 2020

(54) VENTILATED SHELVING HOOK ELEMENT SYSTEM AND METHOD

(71) Applicant: EASYHOME ORGANIZATION MANUFACTURING INC., Ontario, CA (US)

(72) Inventors: Zhi Qiang Lu, Ontario, CA (US); Milton David Ruiz, Germantown, TN (US)

(73) Assignee: EASYHOME ORGANIZATION MANUFACTURING INC., Ontario, CA (US)

( * ) Notice: Subject to any disclaimer, the term of this patent is extended or adjusted under 35 U.S.C. 154(b) by 0 days.

(21) Appl. No.: 15/644,210

(22) Filed: Jul. 7, 2017

(65) Prior Publication Data

US 2018/0135796 A1 May 17, 2018

Related U.S. Application Data

(60) Provisional application No. 62/423,766, filed on Nov. 17, 2016.

(51) Int. Cl.
| | |
|---|---|
| *A47B 96/06* | (2006.01) |
| *F16M 13/02* | (2006.01) |
| *A47B 95/00* | (2006.01) |
| *A47B 96/14* | (2006.01) |
| *A47F 5/10* | (2006.01) |
| *F16B 45/00* | (2006.01) |
| *F16B 21/09* | (2006.01) |
| *F16B 7/22* | (2006.01) |

(52) U.S. Cl.
CPC ............ *F16M 13/02* (2013.01); *A47B 95/008* (2013.01); *A47B 96/061* (2013.01); *A47B 96/067* (2013.01); *A47B 96/1408* (2013.01); *A47B 96/1441* (2013.01); *A47F 5/103* (2013.01); *F16B 7/22* (2013.01); *F16B 21/09* (2013.01); *F16B 45/00* (2013.01)

(58) Field of Classification Search
CPC ... A47B 96/061; A47B 96/1458; A47B 57/42; A47B 96/067; A47B 57/30; A47B 96/1408; A47F 5/0846; A47F 5/0853; A47F 5/0838; A47F 5/0876
See application file for complete search history.

(56) References Cited

U.S. PATENT DOCUMENTS

| | | | | |
|---|---|---|---|---|
| 3,113,678 | A * | 12/1963 | Dickinson ............ | A47B 96/027 108/29 |
| 5,641,081 | A * | 6/1997 | Merl ..................... | A47B 47/022 211/103 |
| 6,119,878 | A * | 9/2000 | Zen ........................ | A47F 5/0846 211/57.1 |
| D437,515 | S * | 2/2001 | Remmers ....................... | D6/566 |
| 7,086,544 | B1 * | 8/2006 | Doench ................ | A47B 61/003 211/105.1 |

(Continued)

*Primary Examiner* — Bradley Duckworth
(74) *Attorney, Agent, or Firm* — WPAT, P.C., Intellectual Property Attorneys; Anthony King

(57) ABSTRACT

A hanger element for one or more receiving bracket apertures that receives a hanging item. The hanger element includes a load bearing, concave shaped flange that attaches to the one or more receiving bracket aperture. A trailing concave shaped, curved hanging structure extends from the load bearing, concave shaped flange.

10 Claims, 27 Drawing Sheets

(56) References Cited

U.S. PATENT DOCUMENTS

| | | | | |
|---|---|---|---|---|
| 7,240,803 B2 * | 7/2007 | Stitchick | A47B 47/022 | 211/106 |
| 7,255,237 B2 * | 8/2007 | Stitchick | A47B 47/022 | 211/106 |
| 7,296,697 B2 * | 11/2007 | Costa | A47B 47/022 | 211/175 |
| 7,314,144 B2 * | 1/2008 | Stitchick | A47B 47/022 | 211/125 |
| 7,448,582 B2 * | 11/2008 | Jackson | A47F 5/0838 | 248/215 |
| 7,694,925 B2 * | 4/2010 | Kokenge | A47F 5/0807 | 248/220.42 |
| 7,900,781 B2 * | 3/2011 | Baine | A47F 5/0838 | 211/106.01 |
| 7,900,783 B2 * | 3/2011 | Fernandez | A47B 45/00 | 108/108 |
| 8,191,845 B1 * | 6/2012 | Yu | F16L 345/00 | 248/220.42 |
| 8,434,629 B2 * | 5/2013 | Fernandez | A47B 96/067 | 211/103 |
| 8,646,624 B2 * | 2/2014 | Fernandez | A47B 45/00 | 108/108 |
| 8,746,472 B2 * | 6/2014 | Thrush | F16M 13/02 | 211/94.01 |
| 8,800,212 B2 * | 8/2014 | Thrush | F16M 13/02 | 211/94.01 |
| 2005/0145147 A1 * | 7/2005 | Costa | A47B 47/022 | 108/108 |
| 2005/0150436 A1 * | 7/2005 | Marchetta | A47B 47/022 | 108/108 |
| 2007/0102604 A1 * | 5/2007 | Nawrocki | A47B 57/40 | 248/220.31 |
| 2014/0048502 A1 * | 2/2014 | Baek | A47F 5/01 | 211/153 |

* cited by examiner

DETAIL B
SCALE 3 : 1

```
┌─────────────────────────────────────────────────────────────┐
│ connect one or more first hand rails in a horizontally or a vertically │
│ disposed position to a wall structure    Step 2802          │
└─────────────────────────────────────────────────────────────┘
                              ↓
┌─────────────────────────────────────────────────────────────┐
│ attach one or more receiving bracket apertures of receiving brack- │
│ ets 101 to the first hang rails          Step 2804          │
└─────────────────────────────────────────────────────────────┘
                              ↓
┌─────────────────────────────────────────────────────────────┐
│ attach a load bearing, concave shaped flange to the receiving │
│ apertures of the none or more receiving brackets  Step 2806 │
└─────────────────────────────────────────────────────────────┘
                              ↓
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
  attach the load bearing, concave shaped flange 108 includes a load
│ bearing, concave shaped rim              Step 2808          │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                              ↓
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
  attach one slot about opposing sides of inner or outer surface of the
│ load bearing, concave shape flange       Step 2810          │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                              ↓
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
  attach one attachment structure about opposing sides of one of
│ inner or outer surface of the load bearing concave shaped flange │
                                          Step 2812
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘

VENTILATED SHELVING HOOK ELEMENT SYSTEM AND METHOD

PRIOR APPLICATIONS

This application claims priority to and incorporates by reference in its entirety provisional application No. 62/423,766 filed on Nov. 17, 2016, by the same inventor(s).

COPYRIGHT NOTICE

One or more portions of this disclosure contain material which is subject to copyright protection. The copyright owner makes no objection to reproduction by anyone of this disclosure as disclosed in the Patent and Trademark Office files, record, or the like. Otherwise, the copyright owner reserves any and all copyright rights whatsoever for this patent disclosure. 37 CFR 1.71(d).

BACKGROUND OF THE INVENTION

(1) Field of the Invention

The field of the invention relates generally to storage systems for conveniently supporting and/or storing objects, more particularly to storage systems that employ at least one vertical rail and/or at least one horizontal track for supporting shelving brackets and/or other components.

(2) Description of Related Art Including Information Disclosed Under 37 CFR 1.97 and 1.98

Storage organizers, shelving units, and other storage systems are known in the art. Some are adjustable and can be arranged and configured in various ways prior to or during installation, within a storage space such as a closet. However, such systems typically cannot be readjusted or easily rearranged after installation, and are typically not compatible with most shelving solutions in the market.

Many examples of shelving systems are known to have vertical risers with multiple perforations provided therein. Once the risers are installed on a wall surface, shelf mounting brackets are mounted on the risers where a shelf is desired. The brackets are provided with hooks shaped for being received in the perforations. The hooks are typically L-shaped such that when received in the perforations, the hooks hold the bracket in the installed position. The brackets are typically designed for a shelf to either merely rest directly on the bracket top surface, or be fastened to the bracket.

Known storage organizers are not typically provided with different types of storage structures. A typical shelving unit comes with shelves and the hardware to mount shelves. Conventional storage organizers are not designed or configured to accommodate different types of storage structures and accessories in the same unit.

All referenced patents, applications and literatures are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply. The invention may seek to satisfy one or more of the above-mentioned desires. Although the present invention may obviate one or more of the above-mentioned desires, it should be understood that some aspects of the invention might not necessarily obviate them.

BRIEF SUMMARY OF THE INVENTION

The inventive subject matter addresses and overcomes the above-described drawbacks of conventional storage systems.

The present storage system is configured to be modular in construction so as to be able to use a plurality of horizontally disposed hang rails and/or a plurality of vertical standards, and/or modular storage components that are received on a hang rail or a vertical standard, or that may be connected directly to a wall structure.

Although the following discloses example storage systems and methods for their use in supporting, storing and/or displaying items, such as for use in a residential environment, persons of ordinary skill in the art will appreciate that the teachings of this disclosure are in no way limited to such specific embodiments. It is contemplated that the teachings of this disclosure may be implemented in alternative configurations and environments. For instance, although the example storage systems and methods described herein are described in conjunction with configurations for supporting or storing items on shelves, by hooks or other modular storage components, for somewhat generalized use, those having ordinary skill in the art will readily recognize that the example storage systems and methods of their use may be employed in supporting, storing and/or displaying many types of items that require specifically configured components.

Similarly, the storage systems and methods illustrated are configured generally for installation against substantially vertical surfaces of wall structures. Also, it will be appreciated that example storage systems and their methods of use may be configured for installation in various locations, such as a garage, basement, laundry room, pantry, mud room, storage room, closet, work shop, retail store, or other facility which has available one or more wall structures that have substantially vertical surfaces. For purposes of this disclosure, such wall structures may be in the form of wall studs, plywood, wall board, plaster over lath, concrete, concrete block or alternative wall structures, as well as doors made of any suitable materials.

The example storage systems and methods shown further provide the advantageous feature of being readily reconfigured. Depending on the particular configuration and placement of the hang rails, vertical standards, and/or modular storage components chosen, this allows additional system components and/or items of various sizes to be later introduced, frequently without resulting in damage or alterations to wall structures or surfaces. This may provide for increased utility and more enhanced convenience during use. Thus, the disclosure includes storage systems that may be installed with one use in mind, and thereafter may continue to be used for that purpose or may be reconfigured for an alternative purpose.

Various embodiments are disclosed herein.

For instance, a hanger element is disclosed for one or more receiving bracket apertures that receives a hanging item. In one example, the hanger element includes a load bearing, concave shaped flange that attaches to the one or more receiving bracket apertures; and a trailing concave shaped, curved hanging structure extended from the load bearing, concave shaped flange.

In another aspect, a hanger element is disclosed for an adapter bracket for connecting a hanging item to a wall mounted unit. In one example, the hanger element includes a load bearing, concave shaped flange that attaches to the adapter bracket, and a trailing concave shaped, curved hanging structure extended from the load bearing, concave shaped flange.

In yet another aspect, a method is disclosed for assembling a wall mounted unit for attaching a hanging item. For example, the method includes the steps of:

i.) connecting one or more first hang rails in a horizontally or a vertically disposed position to a wall structure;

ii) attaching one or more receiving bracket apertures of one or more receiving brackets to the one or more first hang rails; and attaching a load bearing, concave shaped flange to the one or more receiving apertures of the one or more receiving brackets above a trailing concave shaped, curved hanging structure extending from the load bearing, concave shaped flange.

For example, the load bearing, concave shaped flange includes a load bearing, concave shaped rim being between an approximate range of 2 times to 6 times wider than a rim width of a flange about the trailing concave shaped, curved hanging structure and that of a curved upward tip extended from the trailing concave shaped, curved hanging structure that abuts the hanging item.

Thus, the present disclosure presents alternatives to prior art storage systems and provides advantageous features in more readily reconfigurable, secure systems. It is to be understood that bath the foregoing general description and the following detailed description are exemplary and provided for purposes of explanation only, and are not restrictive with respect to the claimed subject matter. Further features and advantages will become more fully apparent in the following description of the preferred embodiments and from the appended claims.

Various objects, features, aspects and advantages of the present invention will become more apparent from the following detailed description of preferred embodiments of the invention, along with the accompanying drawings in which like numerals represent like components.

BRIEF DESCRIPTION OF THE DRAWINGS

It should be noted that the drawing figures may be in simplified form and might not be to precise scale. In reference to the disclosure herein, for purposes of convenience and clarity only, directional terms, such as, top, bottom, left, right, up, down, over, above, below, beneath, rear, front, distal, and proximal are used with respect to the accompanying drawings. Such directional terms should not be construed to limit the scope of the invention in any manner.

FIG. 28 shows a method for assembling a wall mounted unit for attaching a hanging item according to an embodiment of the present invention.

DETAILED DESCRIPTION OF THE INVENTION

The invention and its various embodiments can now be better understood by turning to the following detailed description of the preferred embodiments, which are presented as illustrated examples of the invention. It is expressly understood that the invention may be broader than the illustrated embodiments described below.

The present invention is directed to an organizer system that is adjustable and reconfigurable either before, during, or after installation. The organizer system and its many variations disclosed herein provide a storage solution that is highly versatile and that can be individually customized for virtually any consumers storage needs. The disclosed organizer basic system provides shelving for storage. However, the system can also accommodate clothes hanging. The shelf and optional clothes hanging rod structures can be arranged in a vast array of different configurations.

To add further versatility, the disclosed organizer also can accommodate myriad storage accessories such as storage baskets, shoe storage shelves, shoe racks, and other storage accessories mountable to the basic system. The accessories can be mounted easily and directly to the basic system. The accessories can also be arranged in a wide variety of configurations as desired.

The organizer system and features disclosed herein solve many known problems with existing storage systems in units. The disclosed organizer system can be arranged to accommodate virtually any storage need, to fit in virtually any storage space that is at least large enough to install the minimum basic components, and can be customized utilizing the disclosed or other accessories to store virtually any item. The organizer system disclosed herein can be utilized in closets where it would be particularly well suited. However, the storage system can be mounted in virtually any space that can be used for storage, such as a shed, a laundry room, a basement corner, a garage, or the like.

Figure 1:
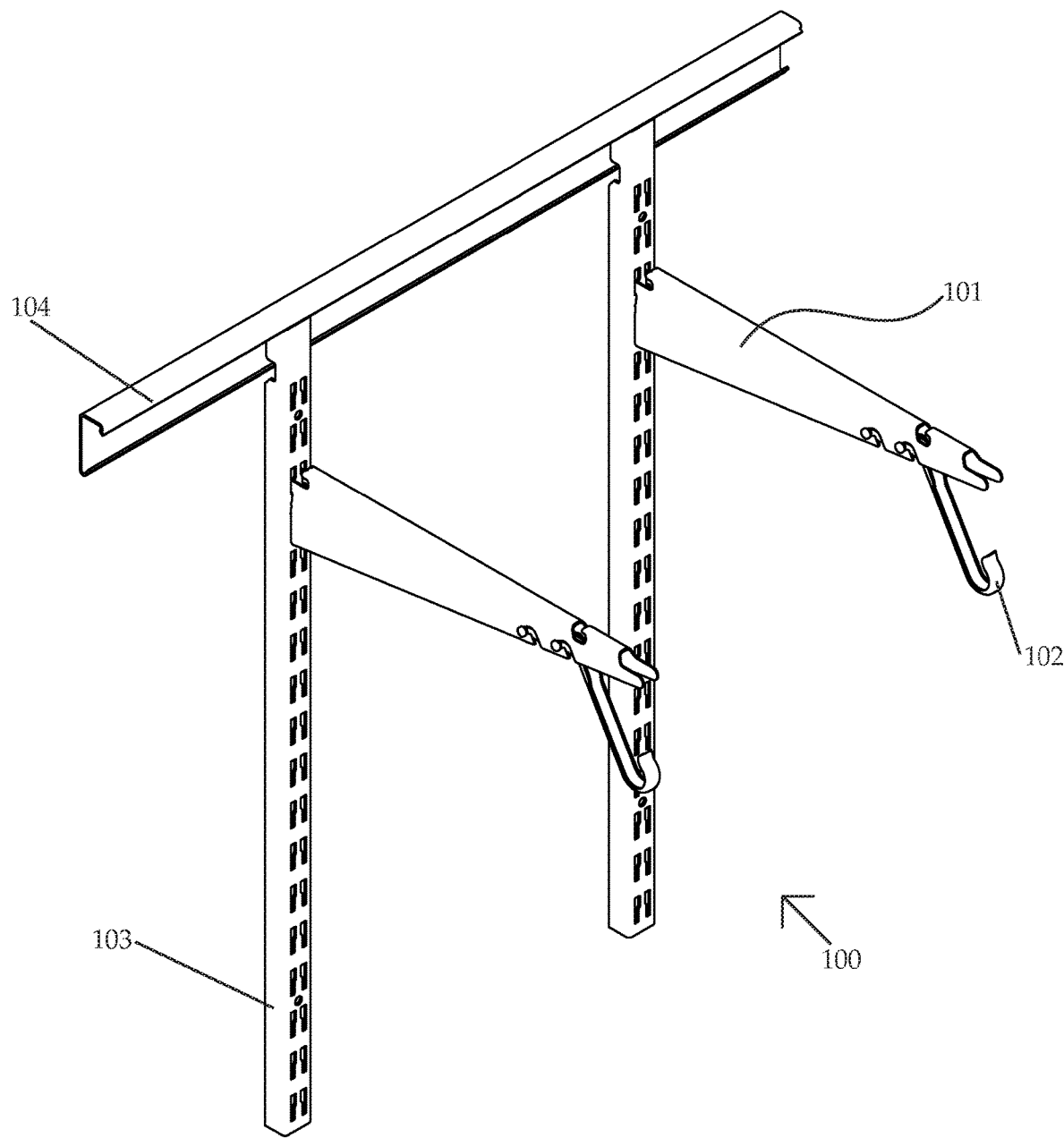
FIG. 1 is a perspective view of a storage shelving system.

Referring now to the drawings, FIG. 1 generally illustrates a storage unit or organizer system 100 constructed in accordance with the teachings of the present invention. The organizer system 100 generally has a number of basic components including a horizontal top rail assembly 104. The system 100 also has a plurality of vertical uprights 103 mounted to and suspended from the top rail assembly 104. Two or more of the uprights can be mounted laterally spaced apart and extending downward from the top rail assembly 104. The uprights are adapted to support the various components of the system and can be adapted to extend over a variety of vertical heights or lengths as explained below. The disclosed organizer system 100 also includes a plurality of shelf mounting brackets 101 mounted to the uprights at desired locations. The system can also comprise a plurality of shelves supportable by the mounting brackets 101. The shelves may provide for width adjustment from a minimum width of a single shelf to virtually any width desired utilizing two or more shelf components also as discussed below.

In addition to the basic system components noted above, the disclosed organizer system 100 also can include a plurality of optional accessories. The basic system can be adapted for mounting one or more optional clothes hanging rods, e.g., connected to hanging elements 102. The system can be further adapted to accommodate one or more additional optional accessories such as storage baskets, shoe racks, shoe shelves, vertically oriented side sliders, or the like. Though not disclosed or described herein, any number of other accessories can be provided for use with and mounting directly on the basic system or indirectly via another optional accessory. Further, though the shelves are described as basic system components, the system can also be configured using only one or more storage accessories mounted to the uprights with no shelves installed.

Figure 2:
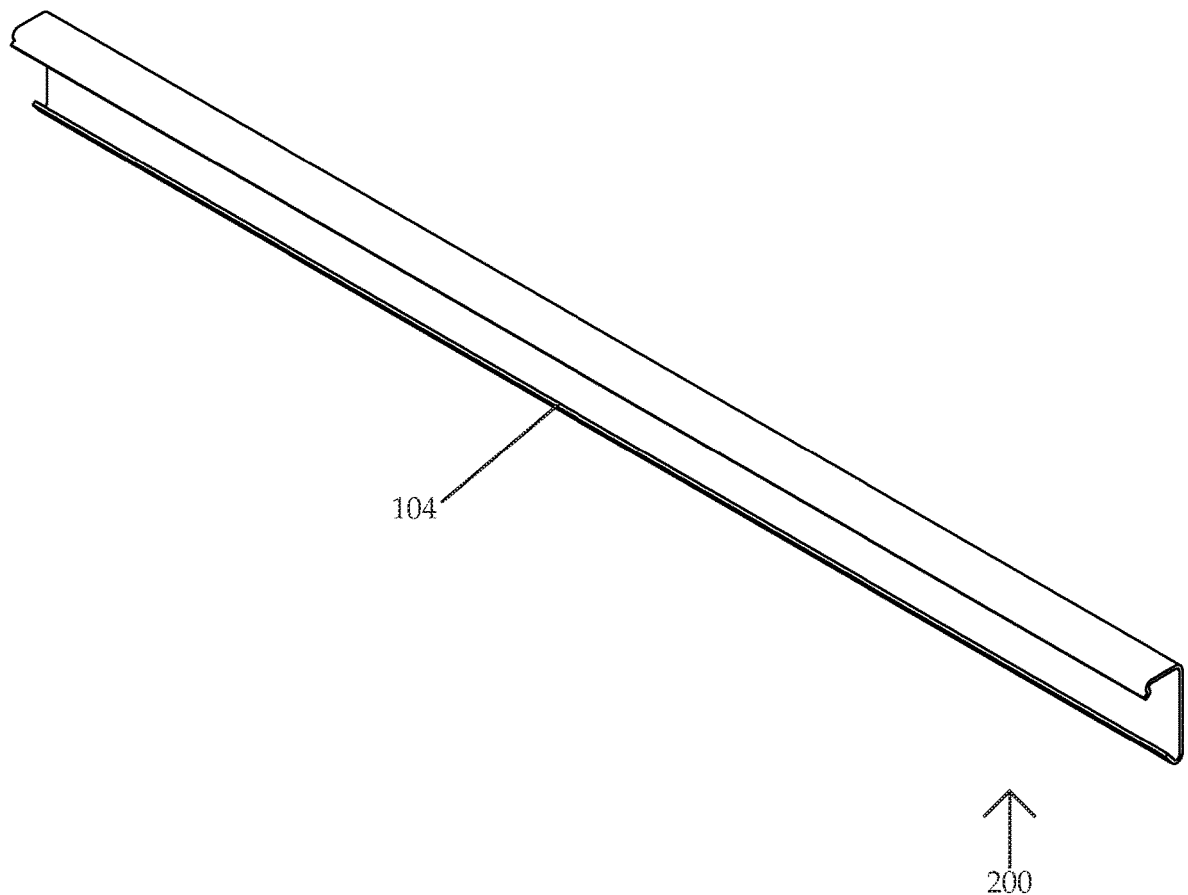
FIG. 2 is a perspective view of a horizontal rail.
Figure 3:
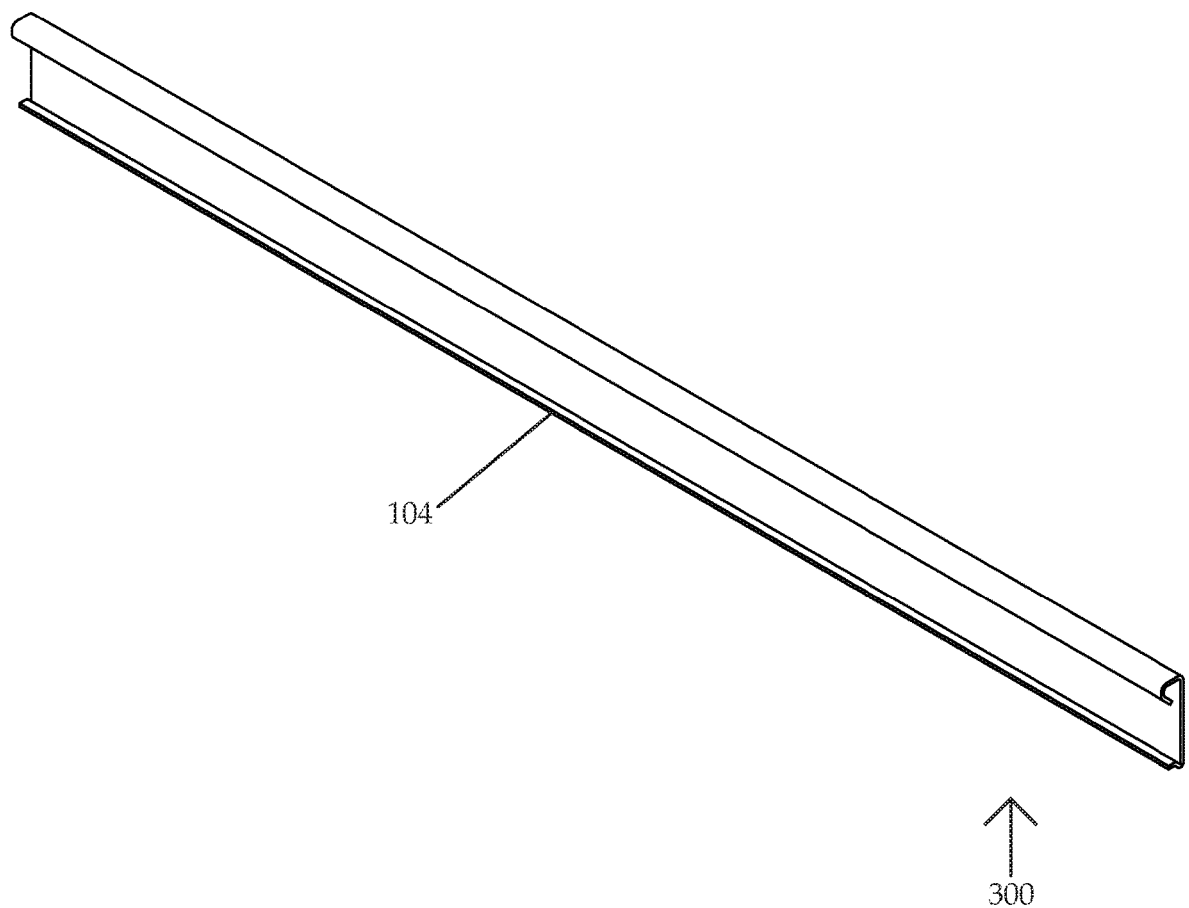
FIG. 3 is a perspective view of another horizontal rail embodiment.

As shown in FIGS. 2-3, the top rail assembly 104 is formed, in this example, having a substantially rigid support rail segments 104 constructed for mounting to a wall or other mounting surface. The top rail assembly 104 can include a plurality of decorative covers that attach to the support rail segments.

Figure 4:
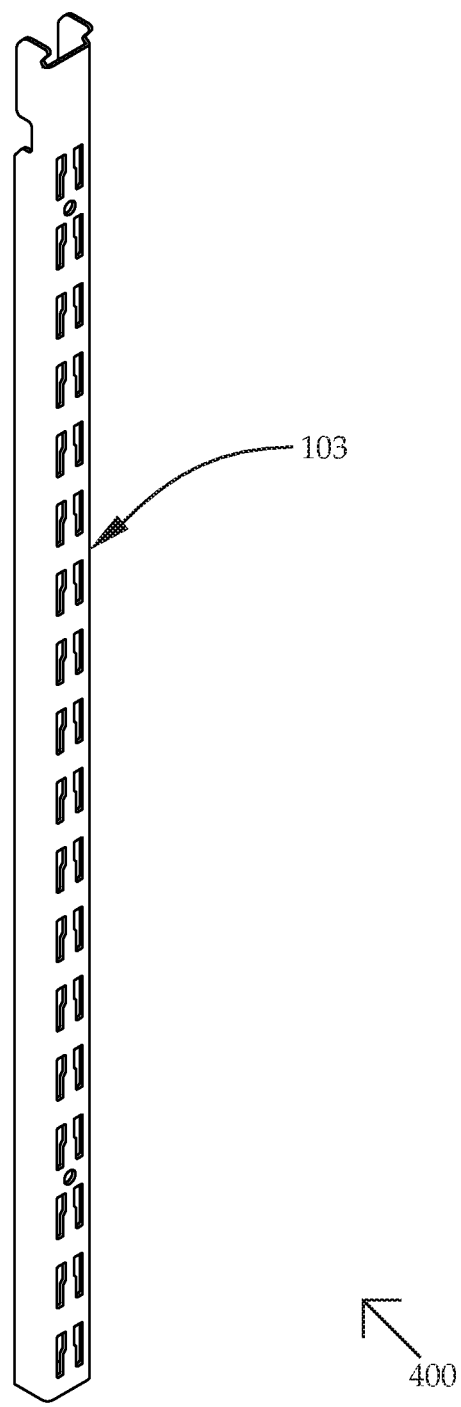
FIG. 4 is a perspective view of a vertical upright.

As shown in FIG. 4, each support rail segment has a mounting section that is generally planar and extends the length of the support rail and defines its bottom edge and part of the rail height. The rail segments are adapted to mount the top rail assembly 32 to a mounting surface. The mounting section of each segment has a plurality of apertures which in this example are spaced apart over the length of each rail segment. Fasteners of any type can be used to mount the rail segments to a mounting surface. The invention is not to be limited to any particular type of mounting used for the rail segments.

The top rail can be length adjustable by placing two adjacent rail segments in an overlapping relationship. Depending upon the amount of overlap of the tow two segments, their combined length can be selected. Adding additional segments permits creating a longer top rail. Any top rail length, from one segment length or longer, can be achieved as desired.

Figure 5:
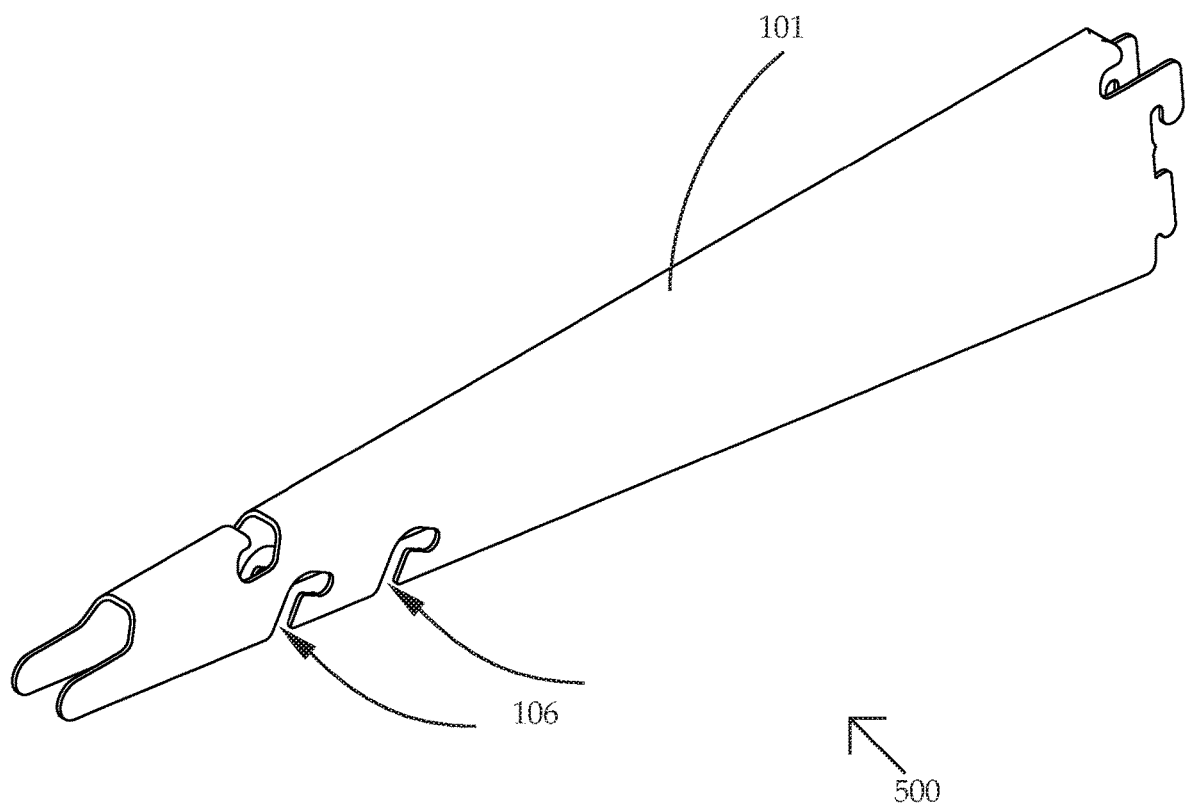
FIG. 5 is a perspective view of one bracket embodiment.

FIG. 5 illustrates an embodiment of a shelf mounting bracket 101. Each bracket 101 has a generally triangular configuration in side profile with a rear end and a forward end. The rear end is taller than the forward end to form a buttress-like shelf supporting structure. As shown in FIG. 5, the bracket 101 in the disclosed example has a generally tall and thin U-shaped configuration with an open bottom and a closed top. Pair of spaced apart sides of the bracket is connected along an integral top surface. Optionally, as shown in FIG. 1, downwardly extending hook extended from each bracket.

Figure 6:
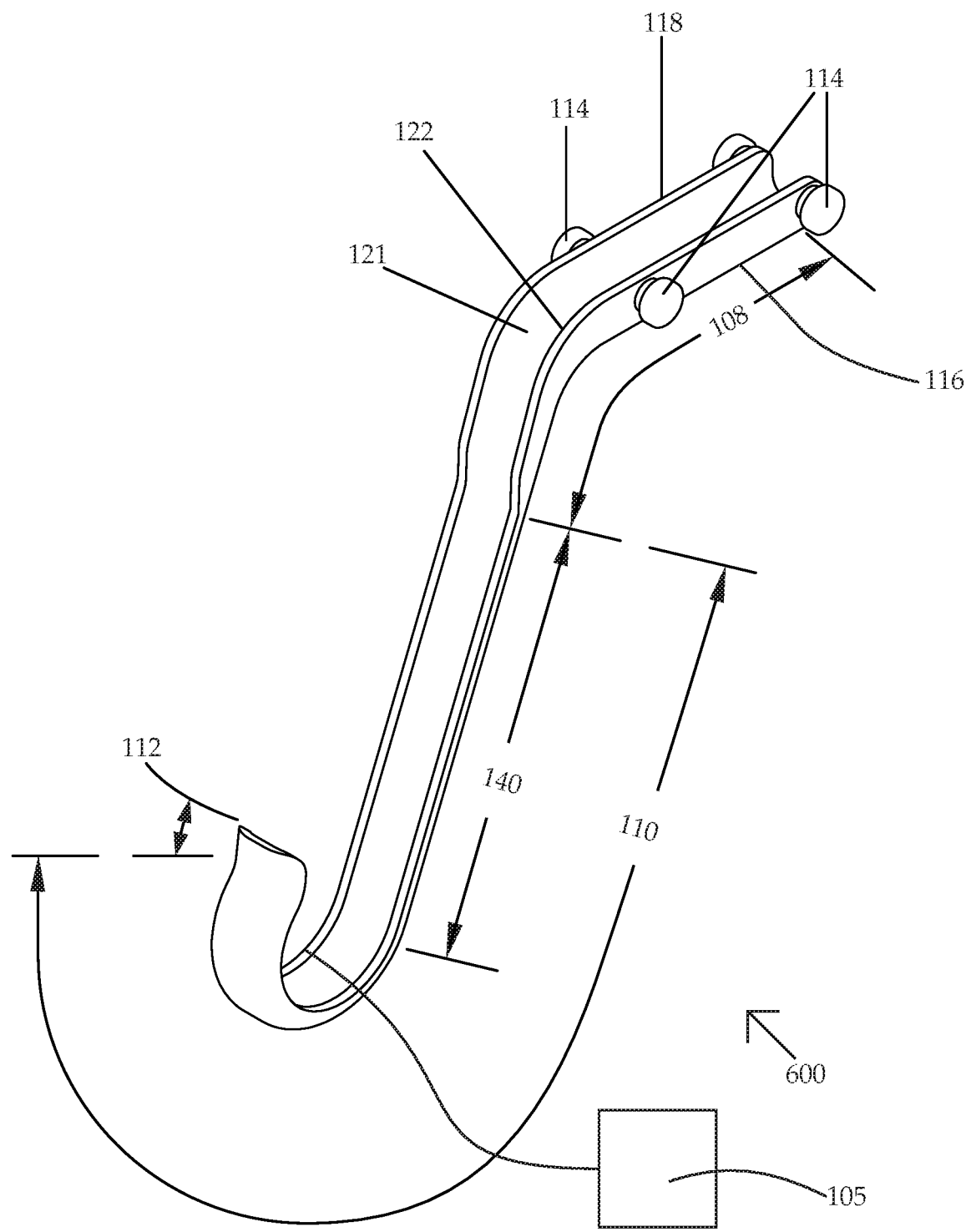
FIG. 6 is a perspective view of one hanger embodiment.
Figure 7:
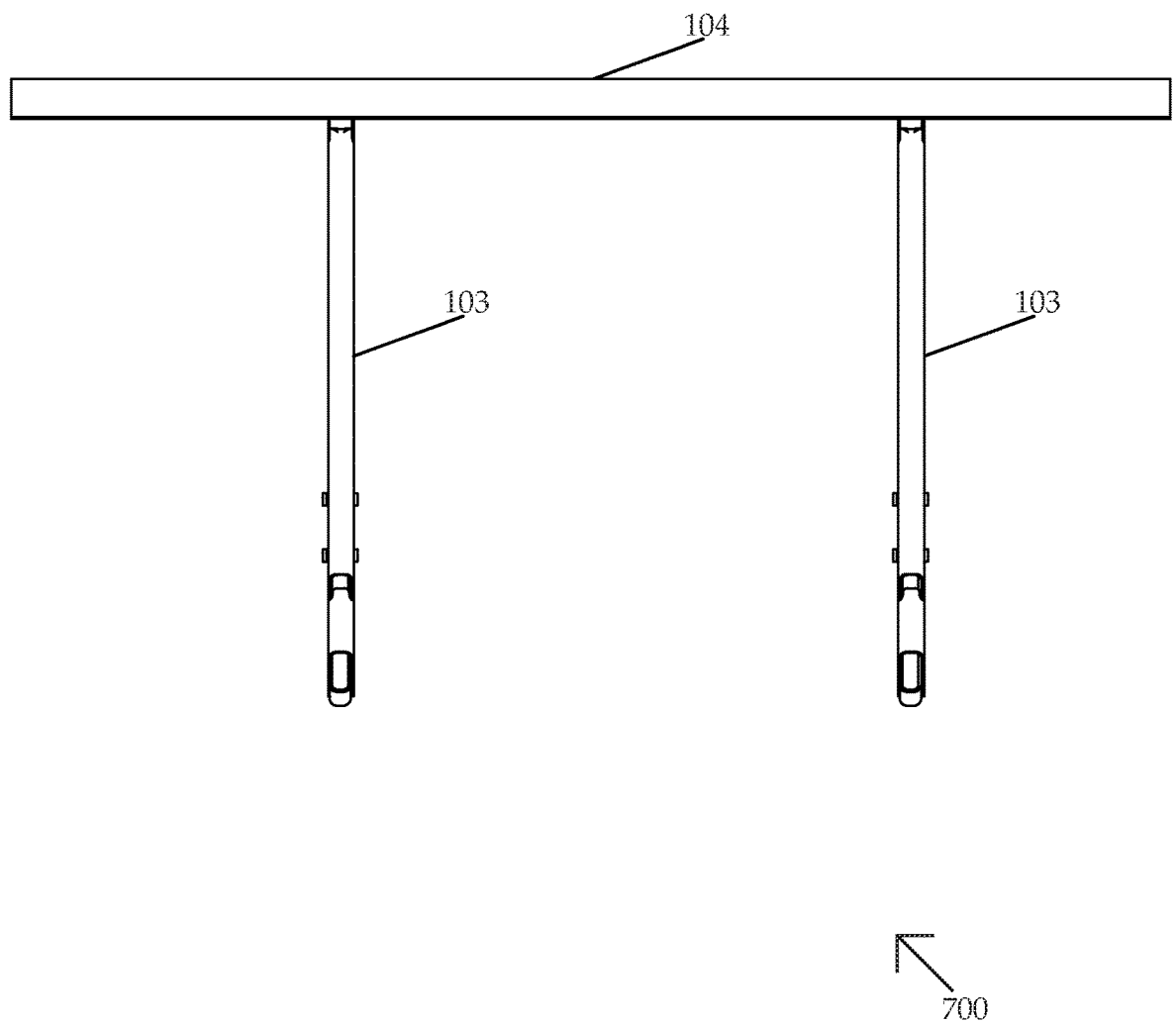
FIG. 7 is a back view of the storage shelving system.
Figure 8:
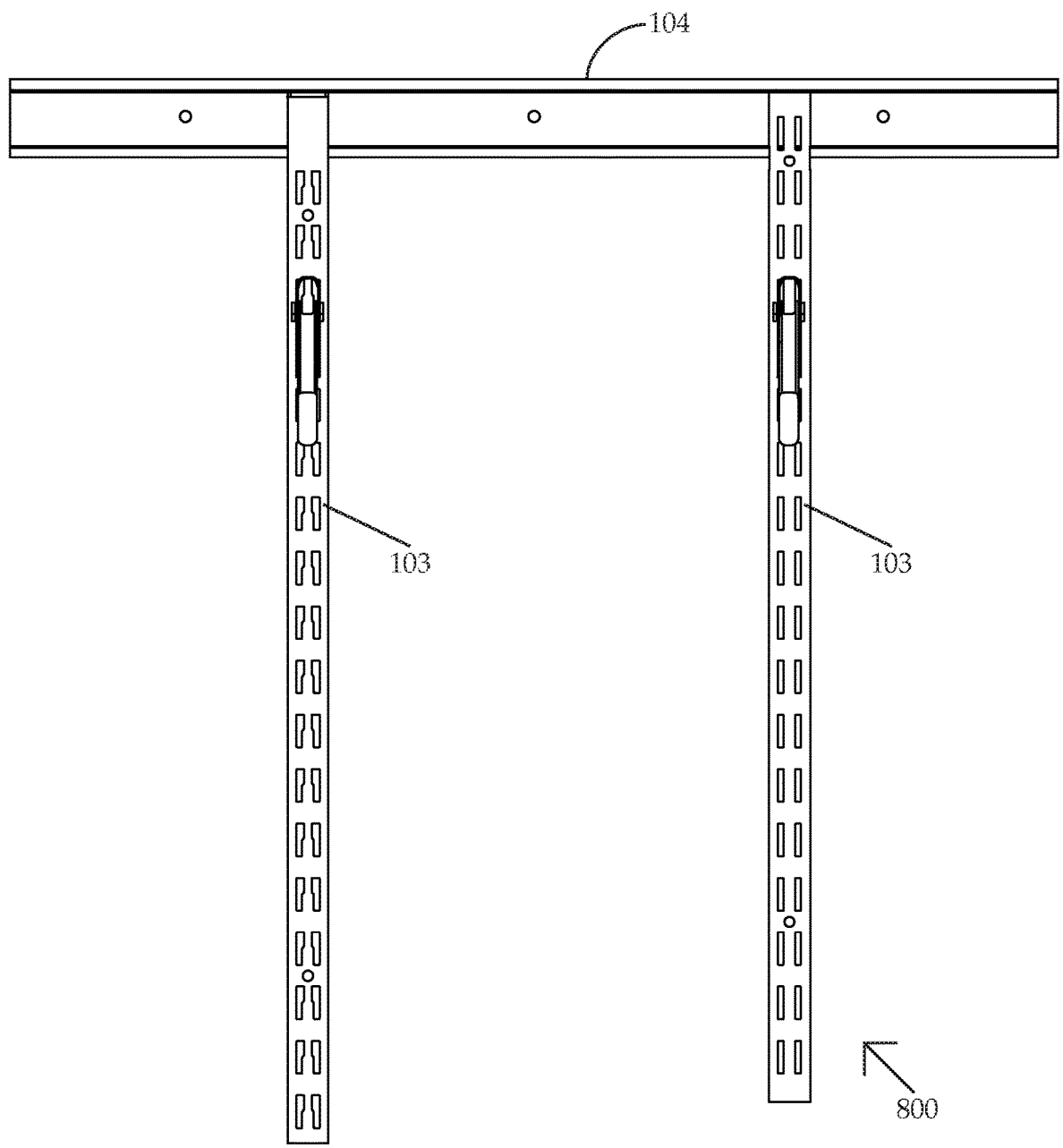
FIG. 8 is a front view of the storage shelving system with different vertical uprights.
Figure 9:
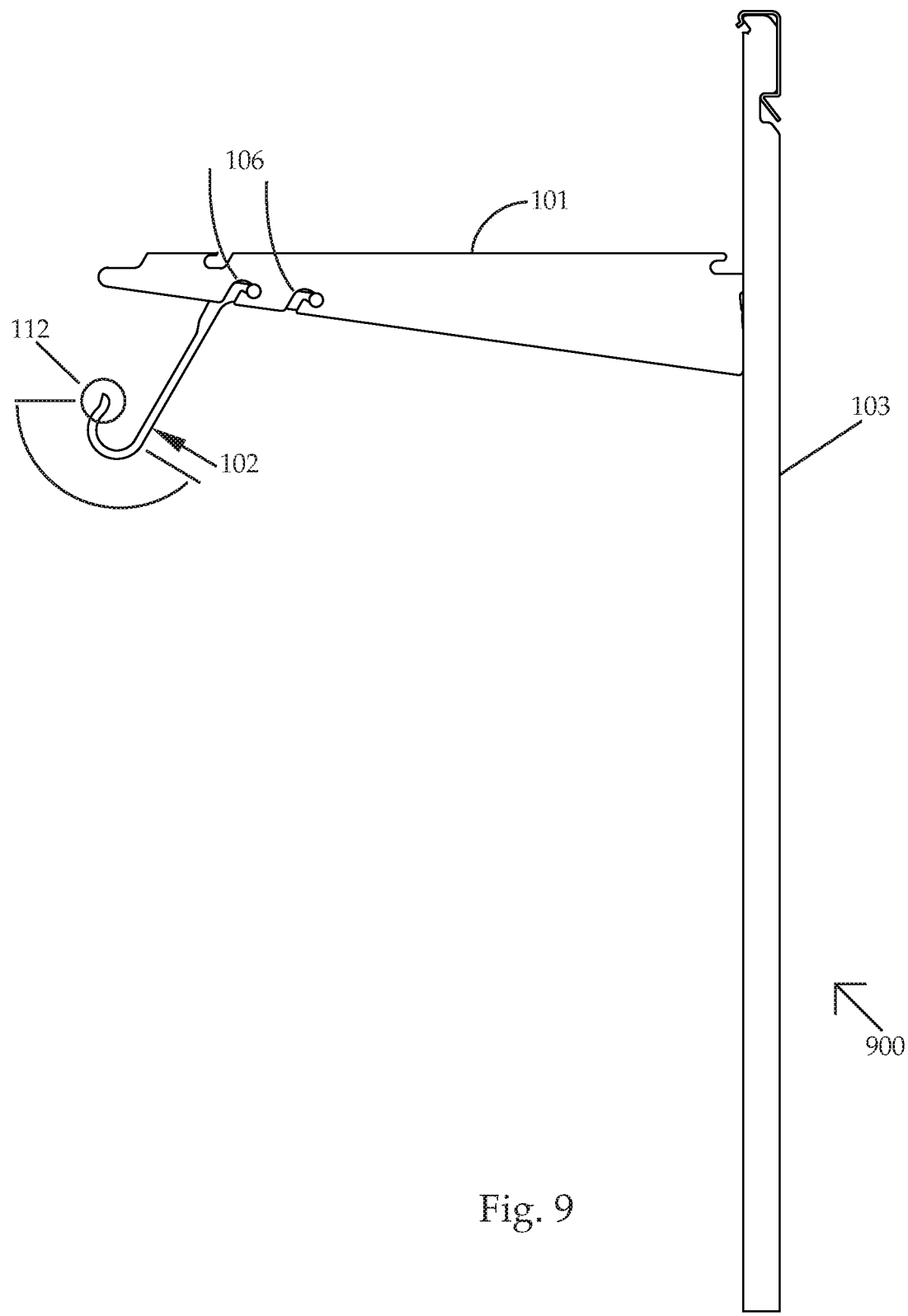
FIG. 9 is a side view of the storage shelving system.
Figure 10:
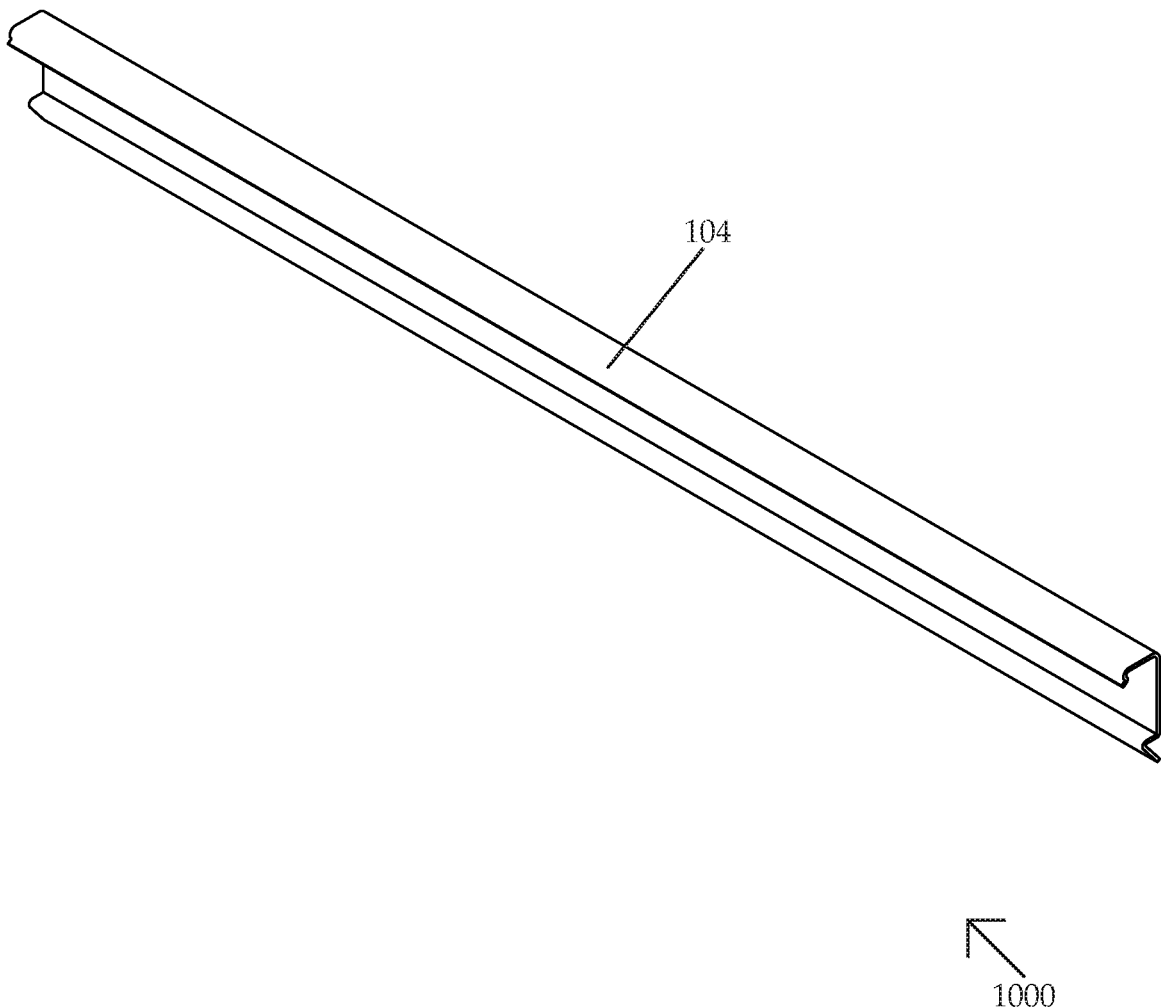
FIG. 10 is a perspective view of another horizontal rail embodiment with details of the side view.
Figure 11:
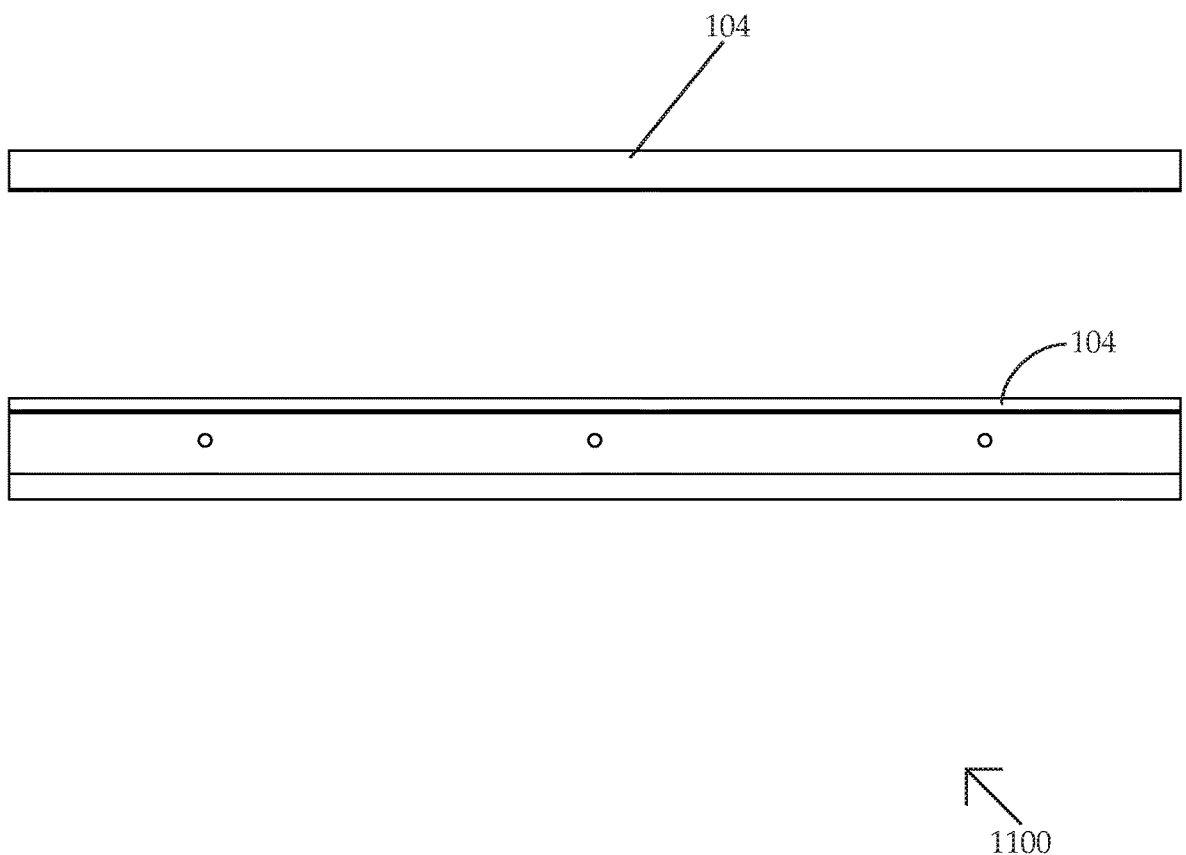
FIG. 11 is a front and back view of another horizontal rail embodiment.
Figure 12:
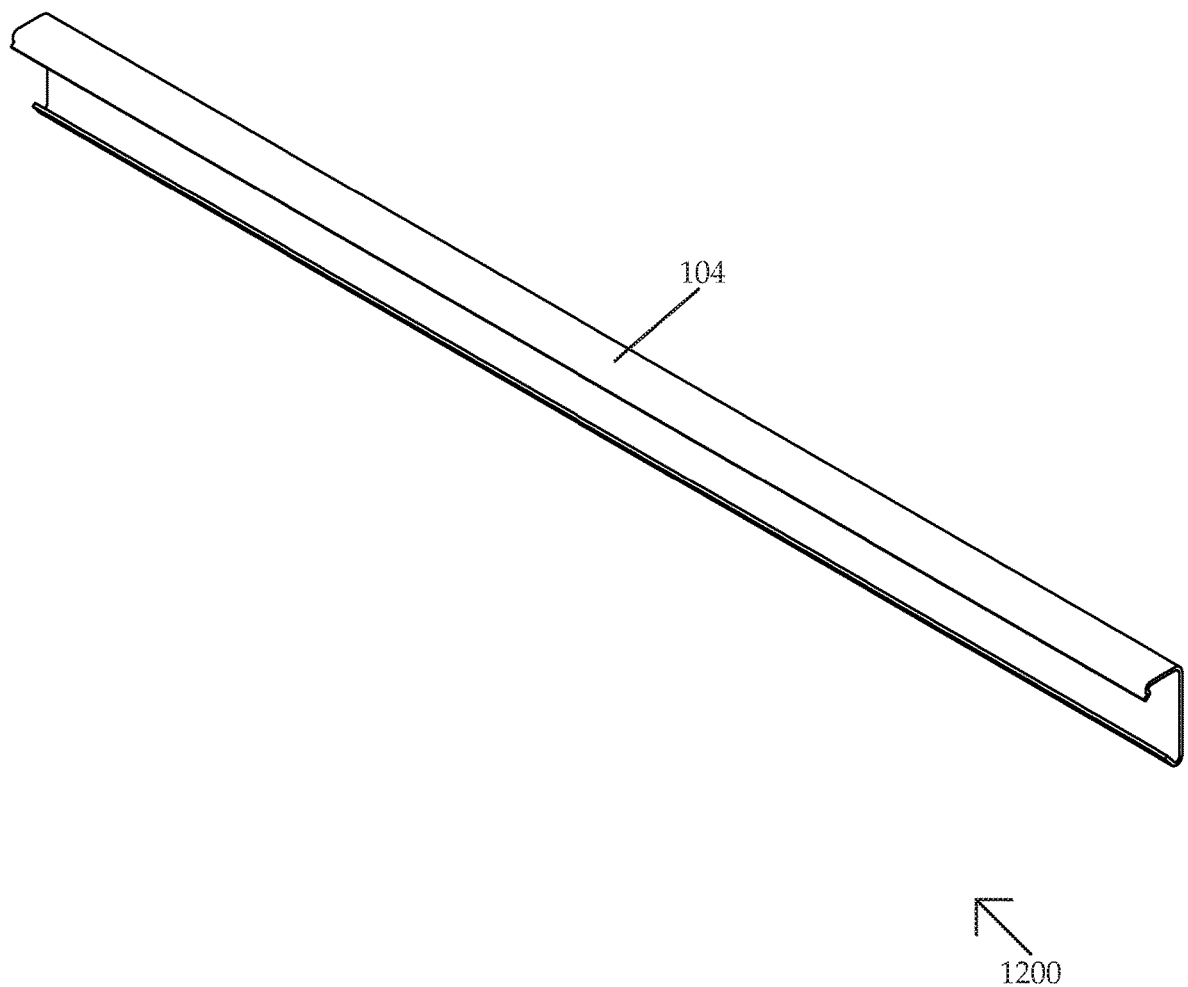
FIG. 12 is a perspective view of another horizontal rail embodiment.
Figure 13:
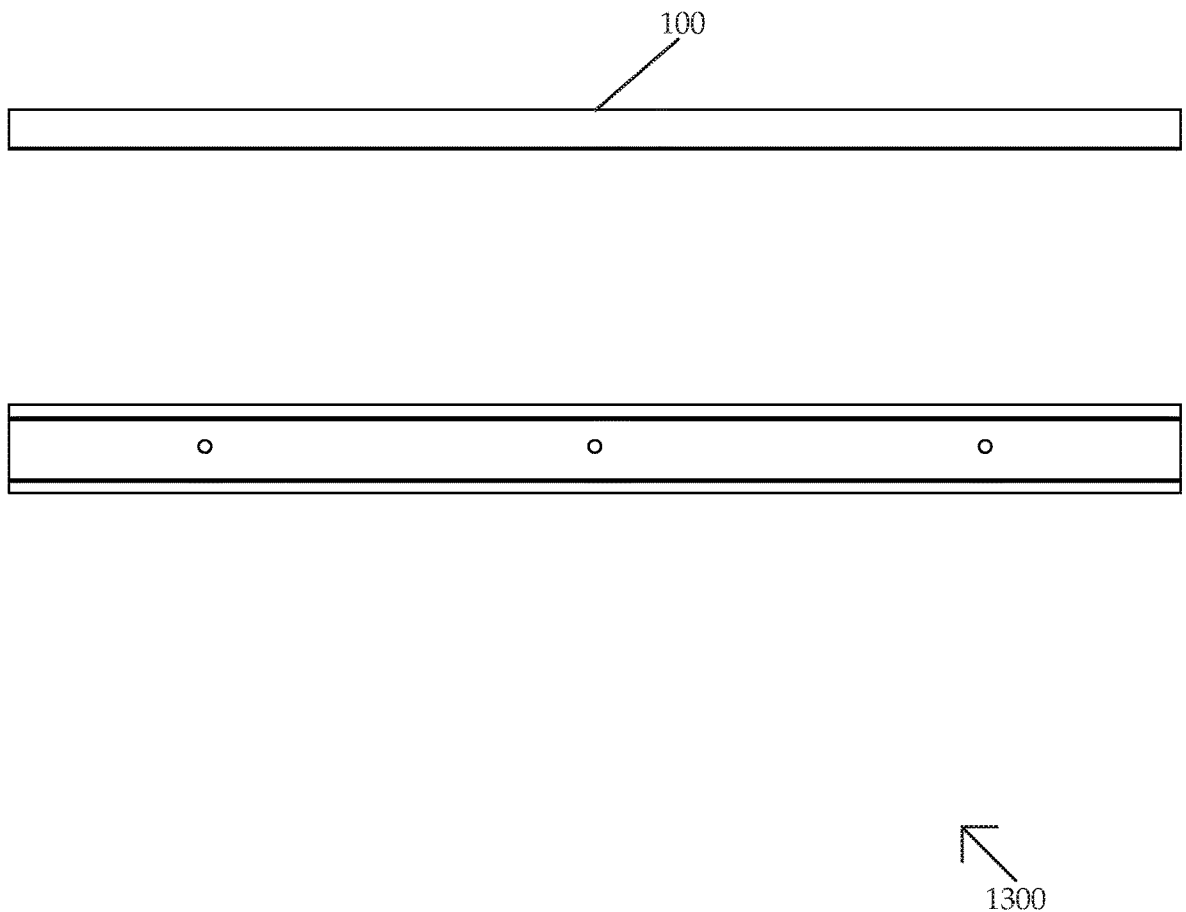
FIG. 13 is a front, back and side view of another horizontal rail embodiment.
Figure 14:
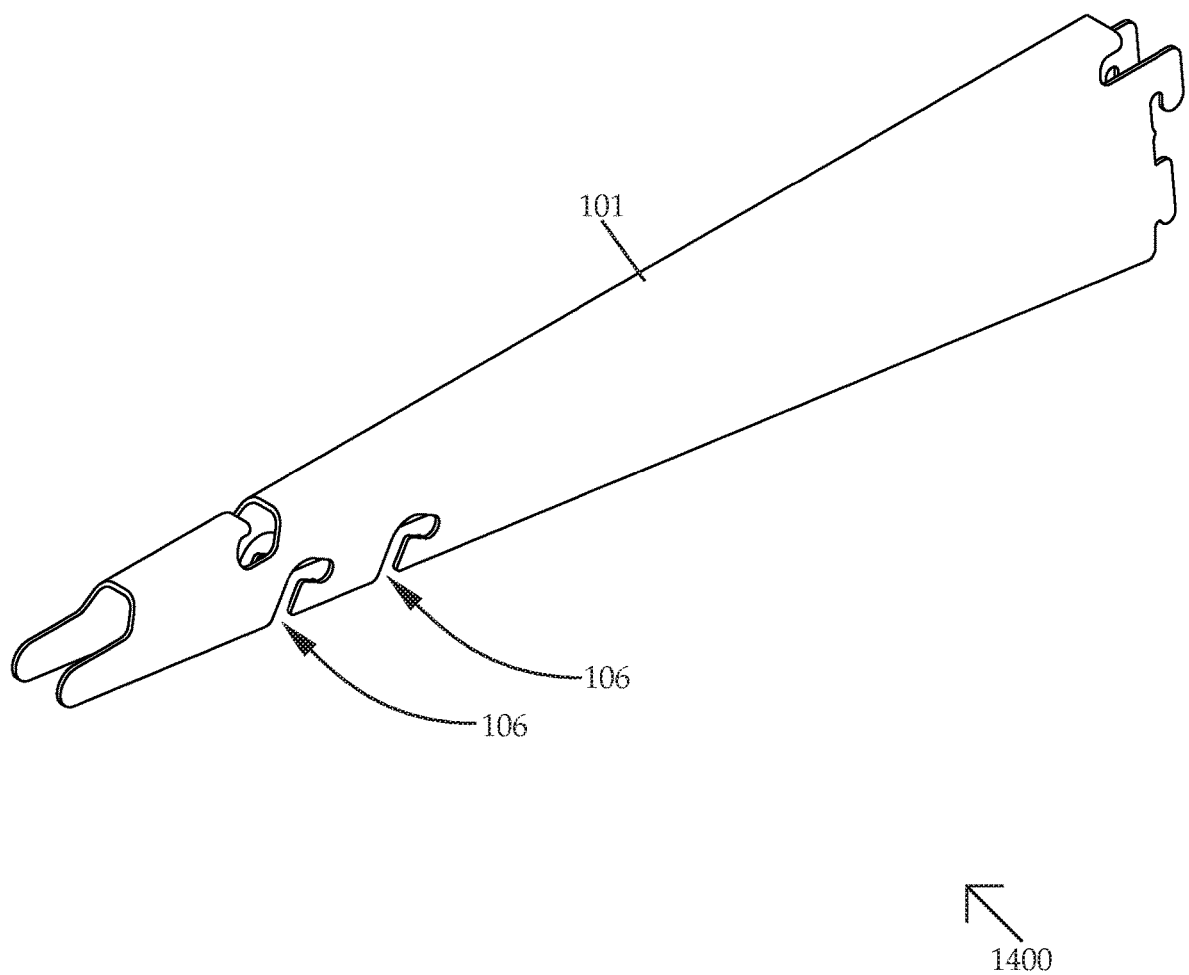
FIG. 14 is a perspective view of a bracket with details of the front view.
Figure 15:
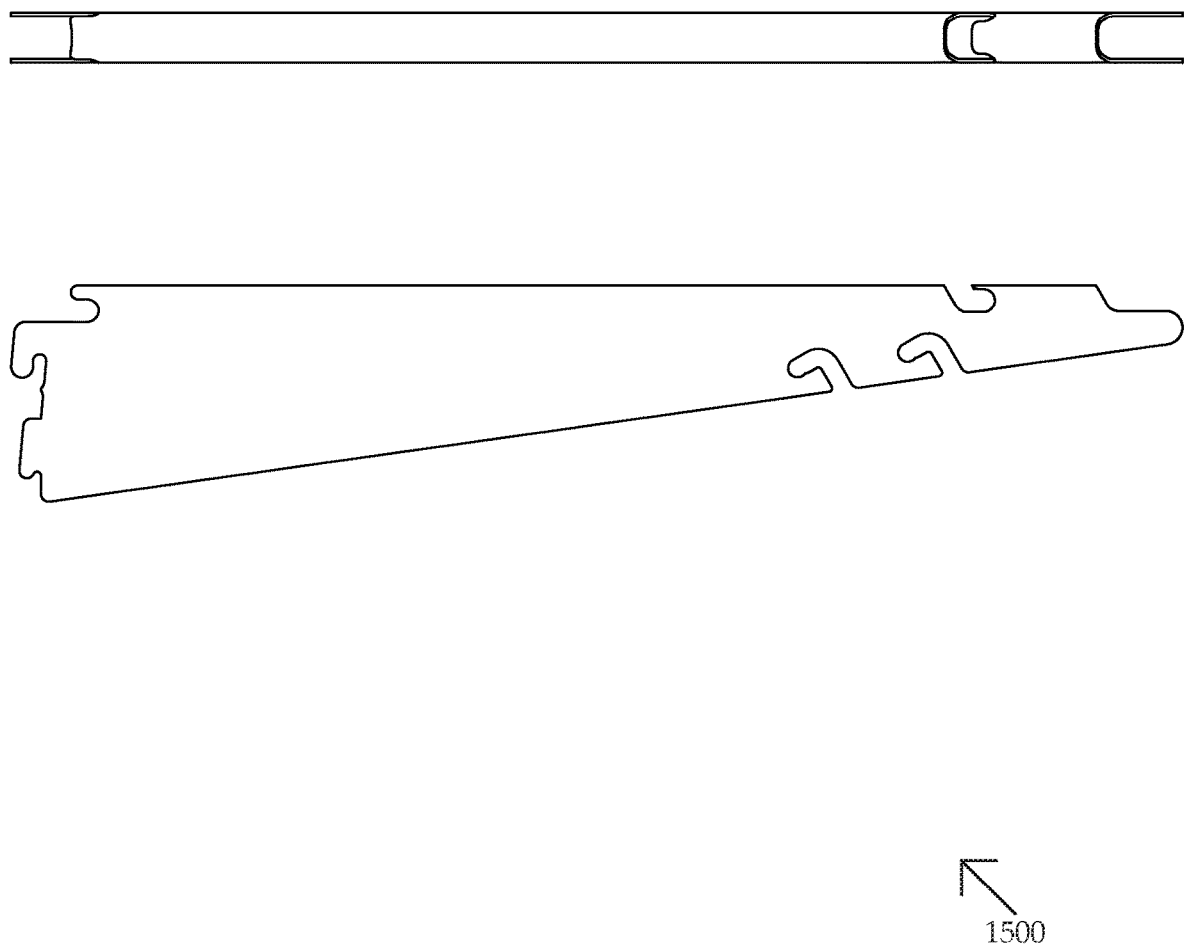
FIG. 15 is a side and bottom view of a bracket.
Figure 16:
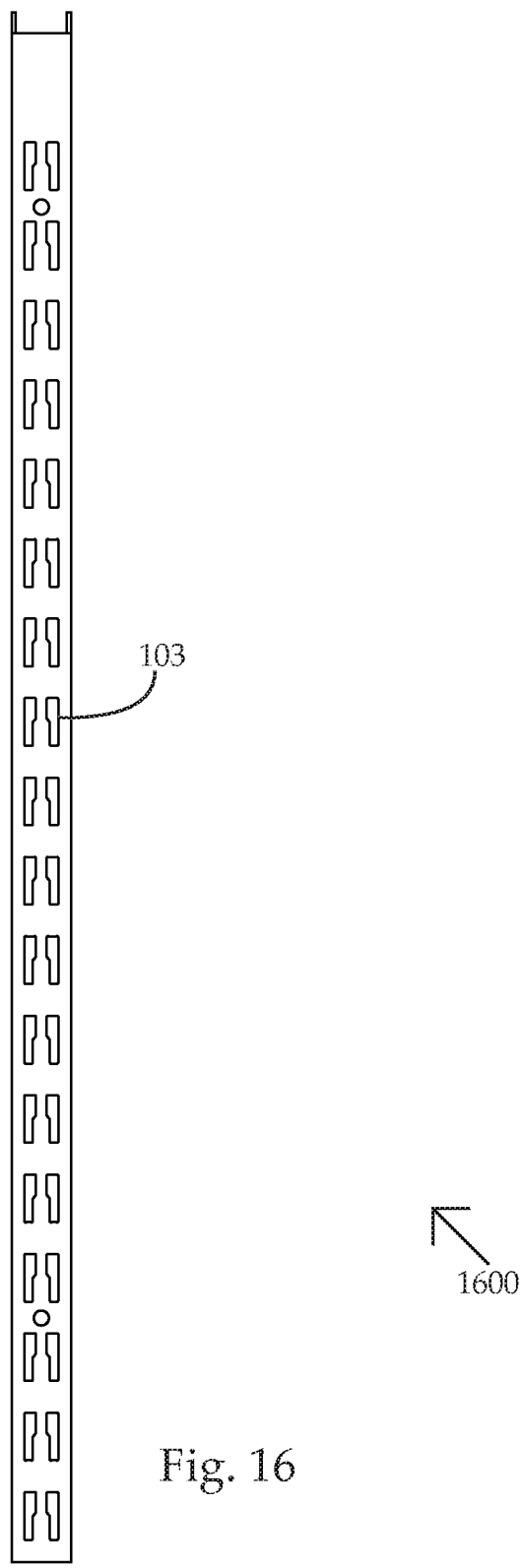
FIG. 16 is a front view of a vertical upright.
Figure 17:
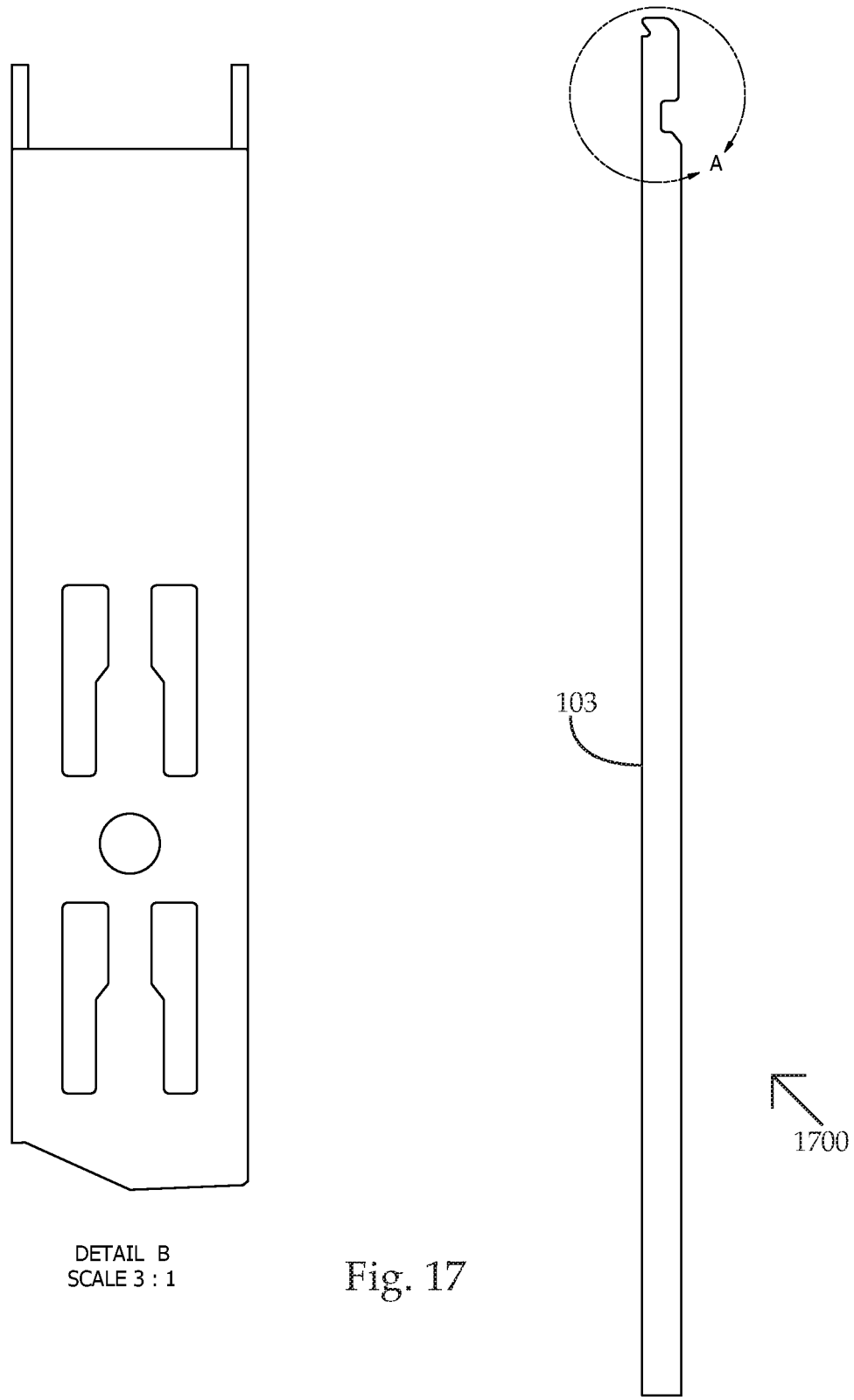
FIG. 17 is a side view of a vertical upright with details of the top portion of the upright.

FIG. 6 shows a hanger element directly, or by connection via a further structure, such as a flange. The hanger element may be in many terms, and may be constructed of a variety of materials. For example, as shown in FIG. 1, the hanger element 102 includes an S-shaped bent wire (or rod), with a proximal portion connected to the central portion in a pivotal manner by the flange. The hanger element 102 can be constructed of any suitable material, such as a metal or a rigid plastic.

In one aspect, as referenced in FIG. 6, a hanger element 102 is disclosed for one or more receiving bracket apertures 106, e.g., as shown in FIG. 5, receive a hanging item 105, as shown in FIG. 6.

A hanging item 105 may include a clothes hanging rod structure, bar, rod or the like, storage basket, storage accessory, shoe storage shelf, shoe rack, other storage accessories, and a variety of other items, e.g., tools, clothing hangers, garments, hangable goods, or the like, mountable thereto.

For example, the hanger element 102 includes a load bearing, concave shaped flange 108 attached to the one or more receiving bracket apertures 106, as shown in FIG. 5, and a trailing concave shaped, curved hanging structure 110 extended from the load bearing, concave shaped flange 108.

In some embodiments, a curved upward tip 112 extends from the trailing concave shaped, curved hanging structure 110 that abuts the received hanging item 105.

In some embodiments, at least one tab 114 about outer surface 116 of the load bearing, concave shaped flange 108 attaches to the one or more receiving bracket apertures 106, e.g., as illustrated in FIGS. 1-5.

For example, the one or more receiving bracket apertures 106 are notch shaped cutouts 106, e.g., as illustrated in FIGS. 1-5, that mate with at least one tab 114 about an outer surface 116, 118 of the load bearing, concave shaped flange 108. For example, the notched cutouts 106 are made to mate with, for instance, at least one tab 114, and in some embodiments, the notched cutouts 106 both removably mate and lock with the at least one tab 114. In some embodiments, the notched shaped cutouts 106 are shaped in a shaped slotted configuration, e.g., t-shaped, v-shaped, s-shaped, x-shaped, or slit-shaped, so as to slide onto, push into, and/or slide, push, and lock into a mating feature, e.g., at least one tab 114, on an outer 116, 118, or inner surface 121, 122 of the load bearing, concave shaped flange 108.

In some embodiments, at least two tabs 114 about opposing sides of outer surfaces 116, 118 of the load bearing, concave shaped flange 108 that attaches to the one or more receiving bracket apertures 106, e.g., as illustrated in FIGS. 1-5.

In some embodiments, at least two tabs 114 about opposing sides of inner surfaces 121, 122 of the load bearing, concave shaped flange 108 that attaches to the one or more receiving bracket apertures 106, e.g., as illustrated in FIGS. 1-5.

Figure 19:
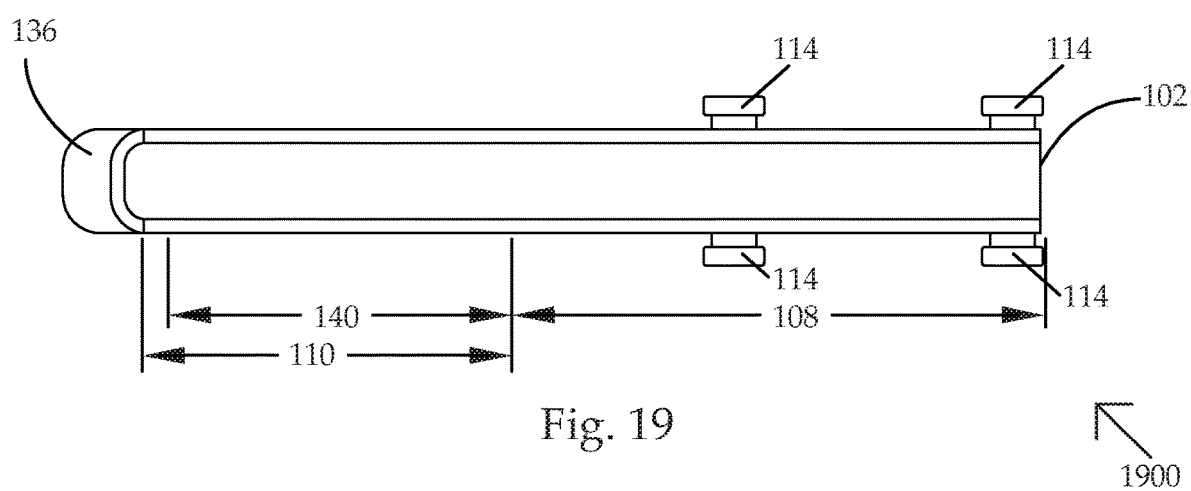
FIG. 19 is a bottom view of a hanger.
Figure 20:
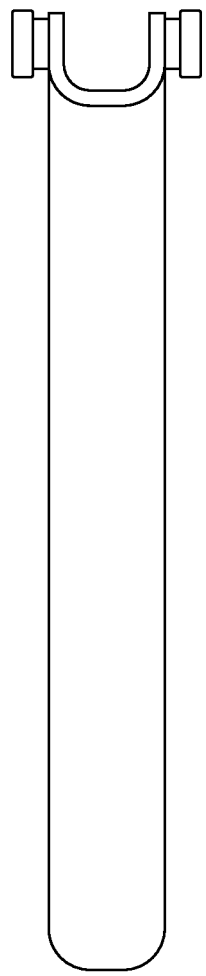
FIG. 20 is a top view of a hanger.
Figure 21:
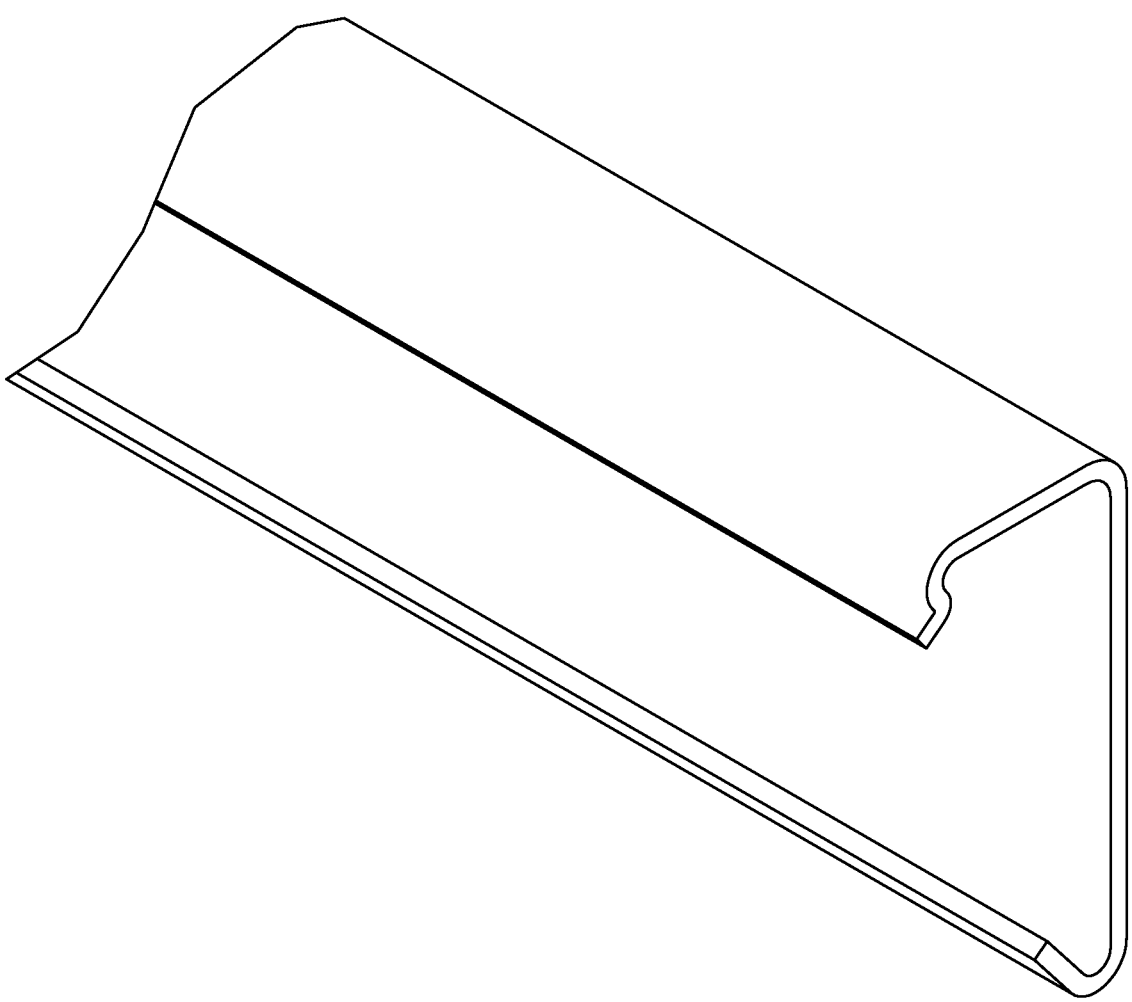
FIG. 21 is a close up view of one embodiment.
Figure 21:
Figure 22:
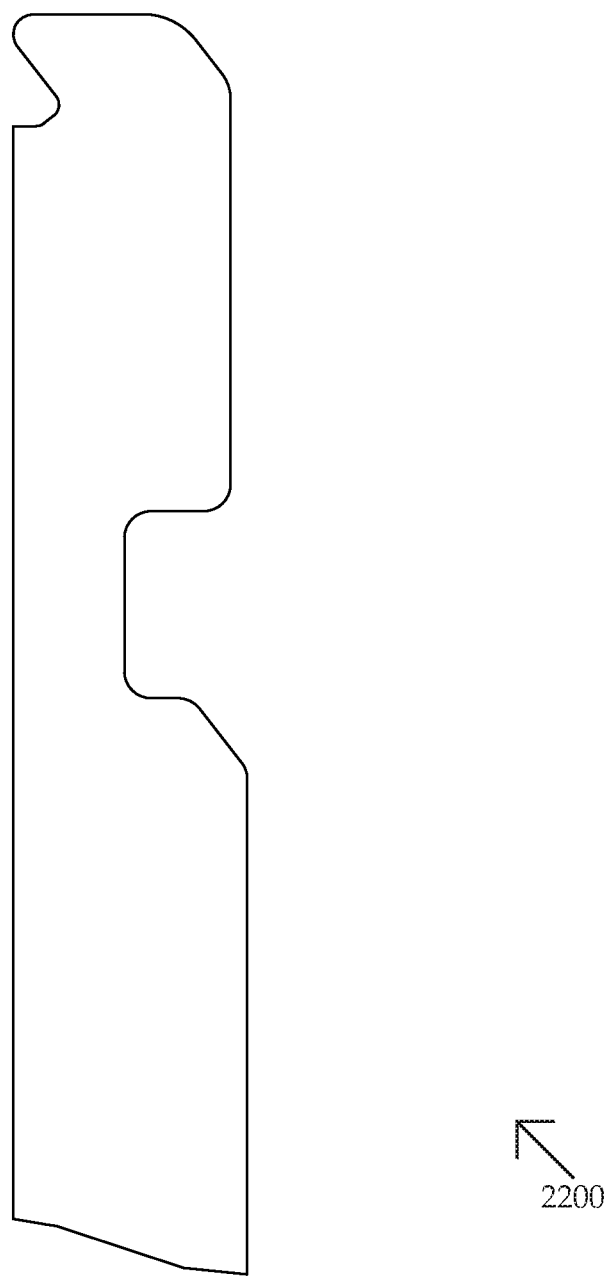
FIG. 22 shows the dimension of another embodiment.
Figure 23:
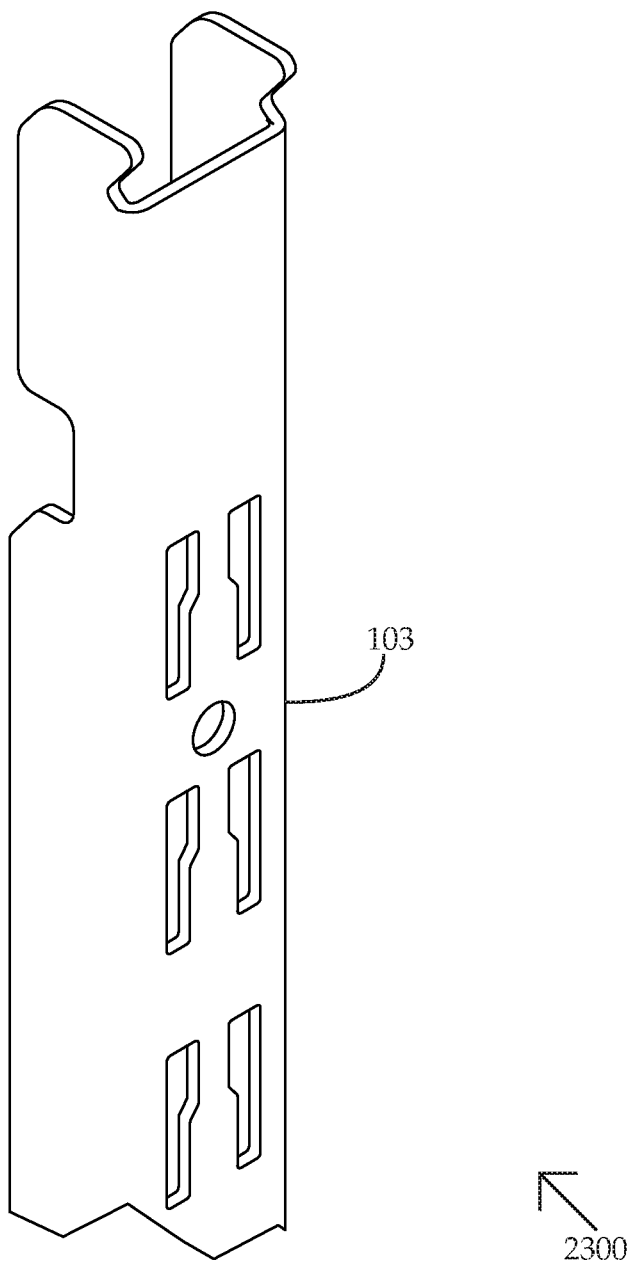
FIG. 23 is a close up view of one embodiment.
Figure 24:
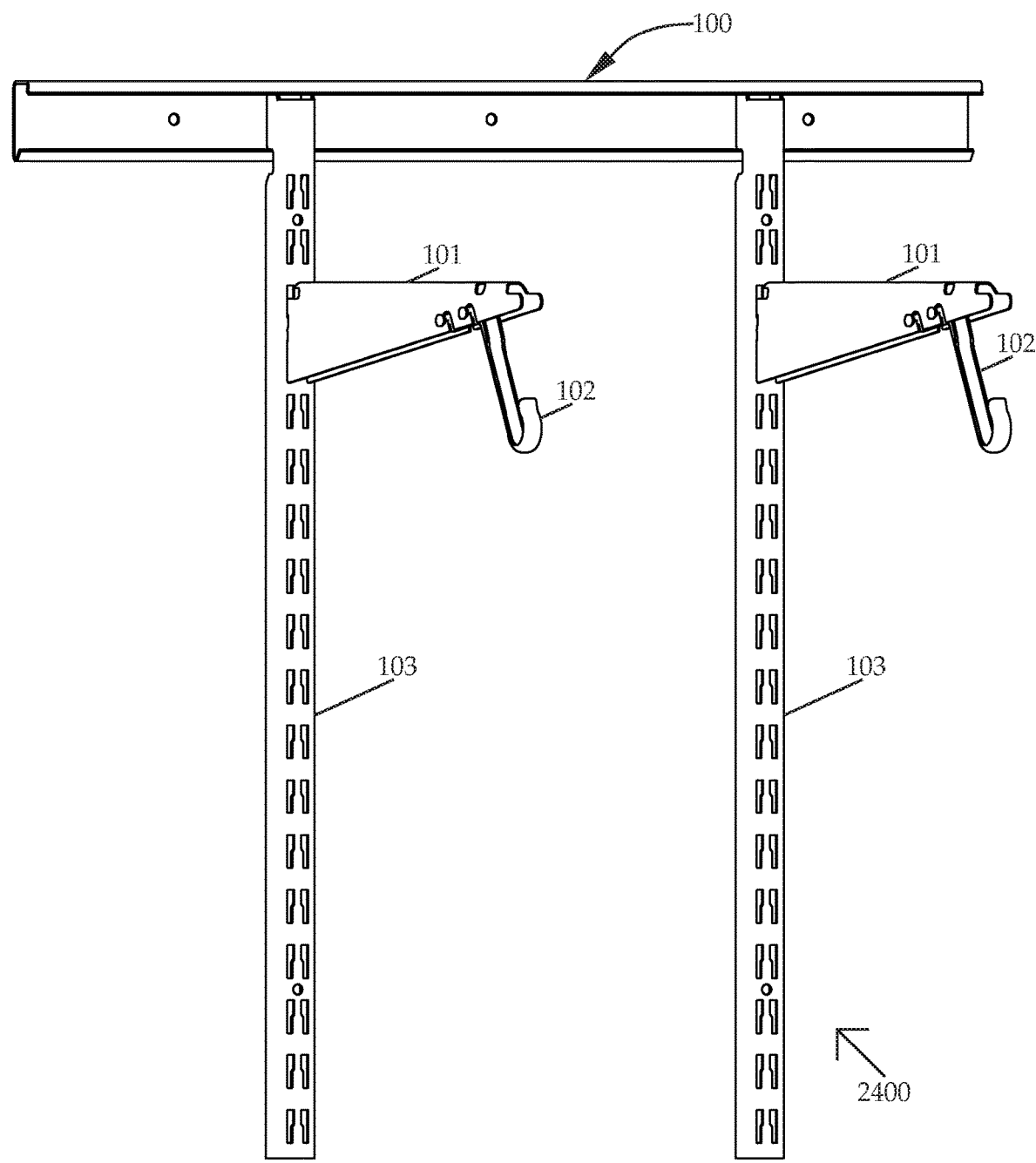
FIG. 24 shows another embodiment where a leveler is sold together as part of the product as a novel way of installation and a novel way of marketing such products. It also shows a novel rail where length scale is provided thereon to facilitate installation. A user may easily determine where to fasten the next screw onto the wall by when a first stud was detected. In this way, a user simply looks at the length scale (and based on his/her knowledge of the standard distance between studs) and know where to fasten the next screw to hit the stud.
Figure 25:
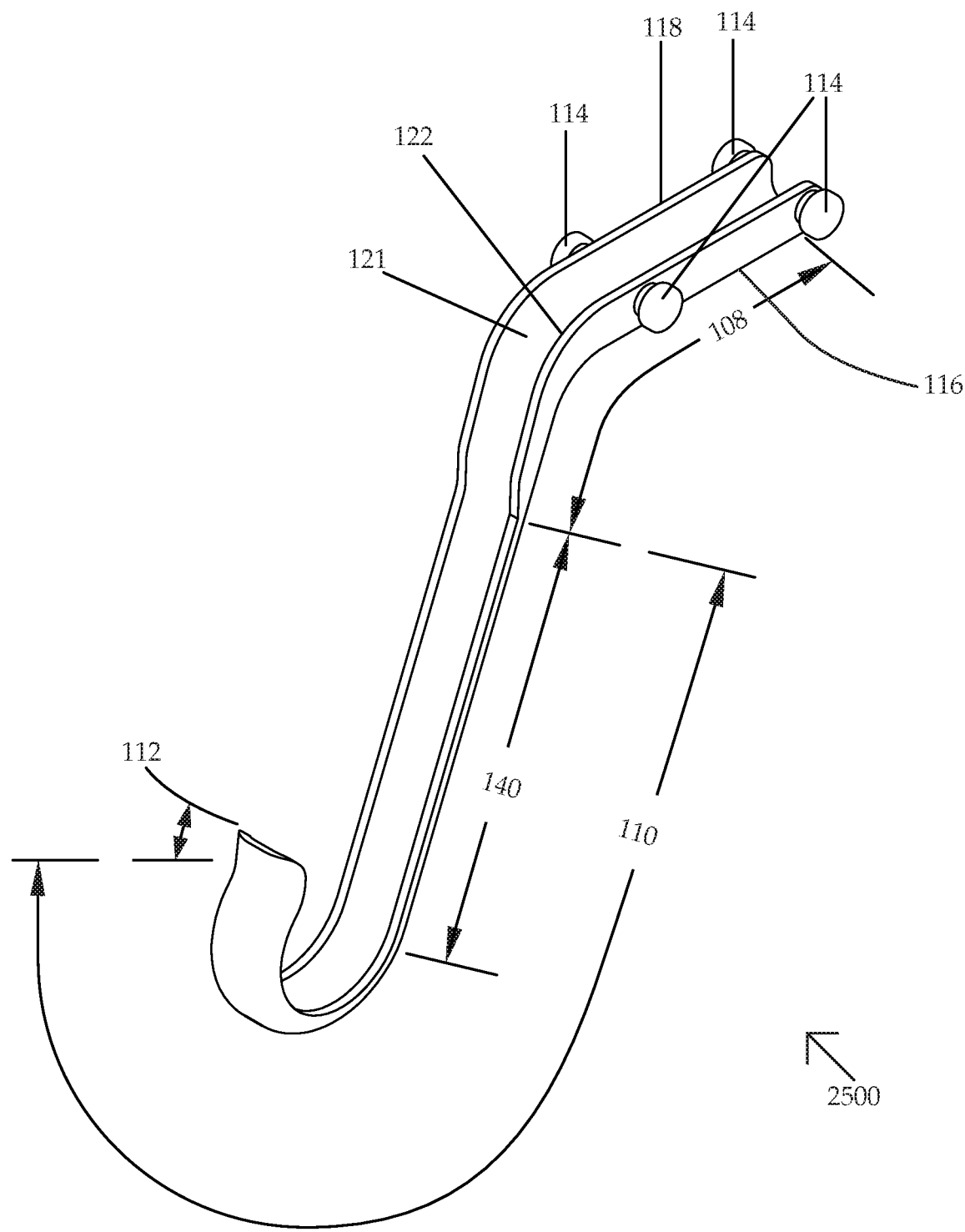
FIG. 25 shows a hanger having at least one tab structure(s) according to an embodiment of the present invention.

In some embodiments, as illustrated in FIG. 25, at least one tab 114, i.e., same as at least one tab 114 as discussed herein, for example, as referenced in FIG. 19, about opposing sides of at least one of inner 121, 122 or outer surfaces 116, 118 of the load bearing, concave shaped flange 108 that attaches to the one or more receiving bracket apertures 106, as illustrated in FIG. 5.

Figure 26:
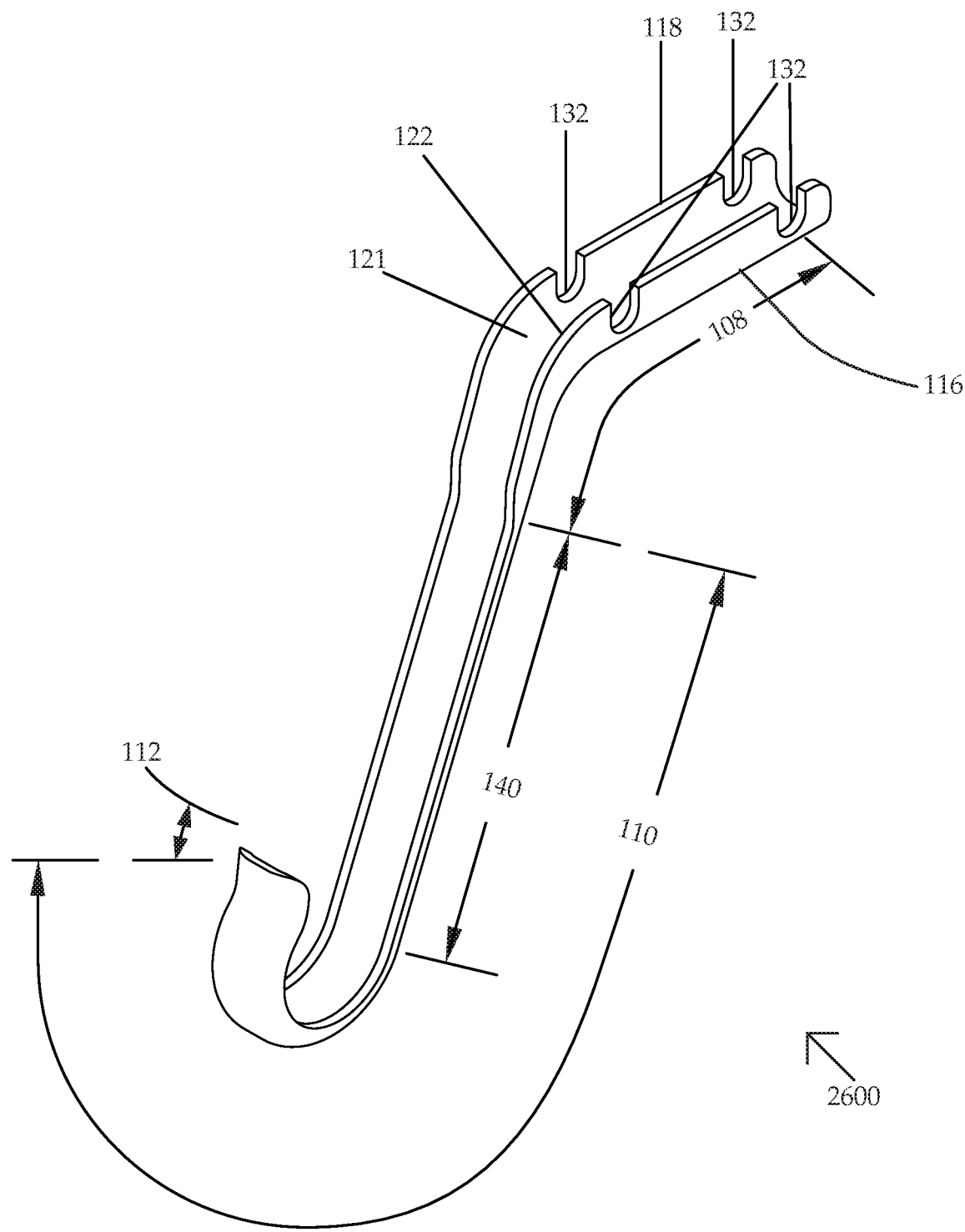
FIG. 26 shows a hanger having slotted attachment structure(s) according to an embodiment of the present invention.

In some embodiments, as illustrated in FIG. 26, at least one slot 132, e.g., hole, groove, opening, or the like, about opposing sides of at least one of inner 121, 122 or outer surfaces 116, 118 of the load bearing, concave shaped flange 108 that attaches to the one or more receiving bracket apertures 106, as illustrated in FIG. 5.

Figure 27:
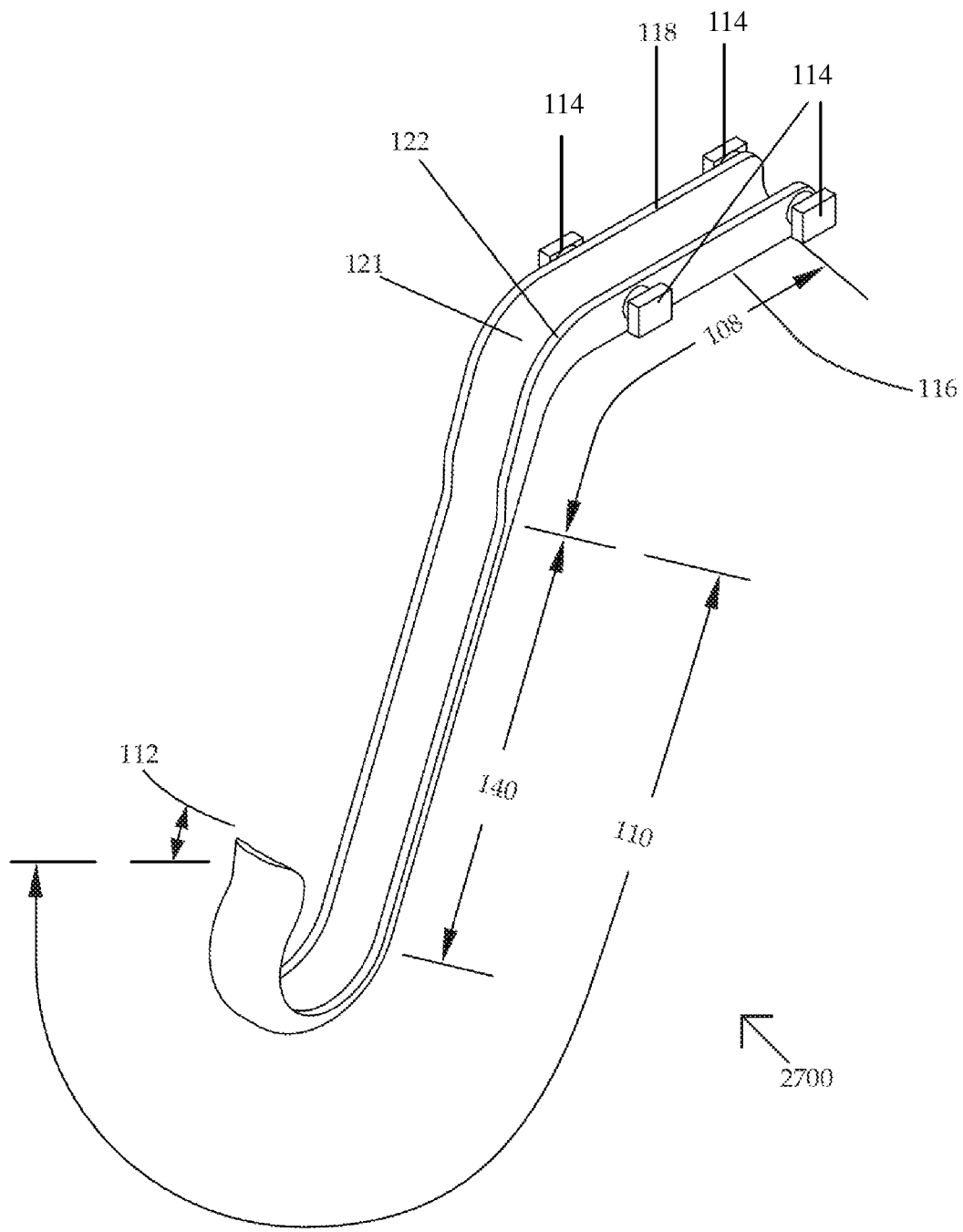
FIG. 27 shows a hanger having rectangular attachment structure(s) according to an embodiment of the present invention.

In some embodiments, as illustrated in FIG. 27, at least one attachment structure 114, e.g., tab (see FIG. 6), rivot, bolt, protruding structure, mating structure, or the like, about one or more opposing sides of at least one of inner 121, 122 or outer surfaces 116, 118 of the load bearing, concave shaped flange attaches to the one or more receiving bracket apertures 106, e.g., as illustrated in FIGS. 1-5.

Figure 18:
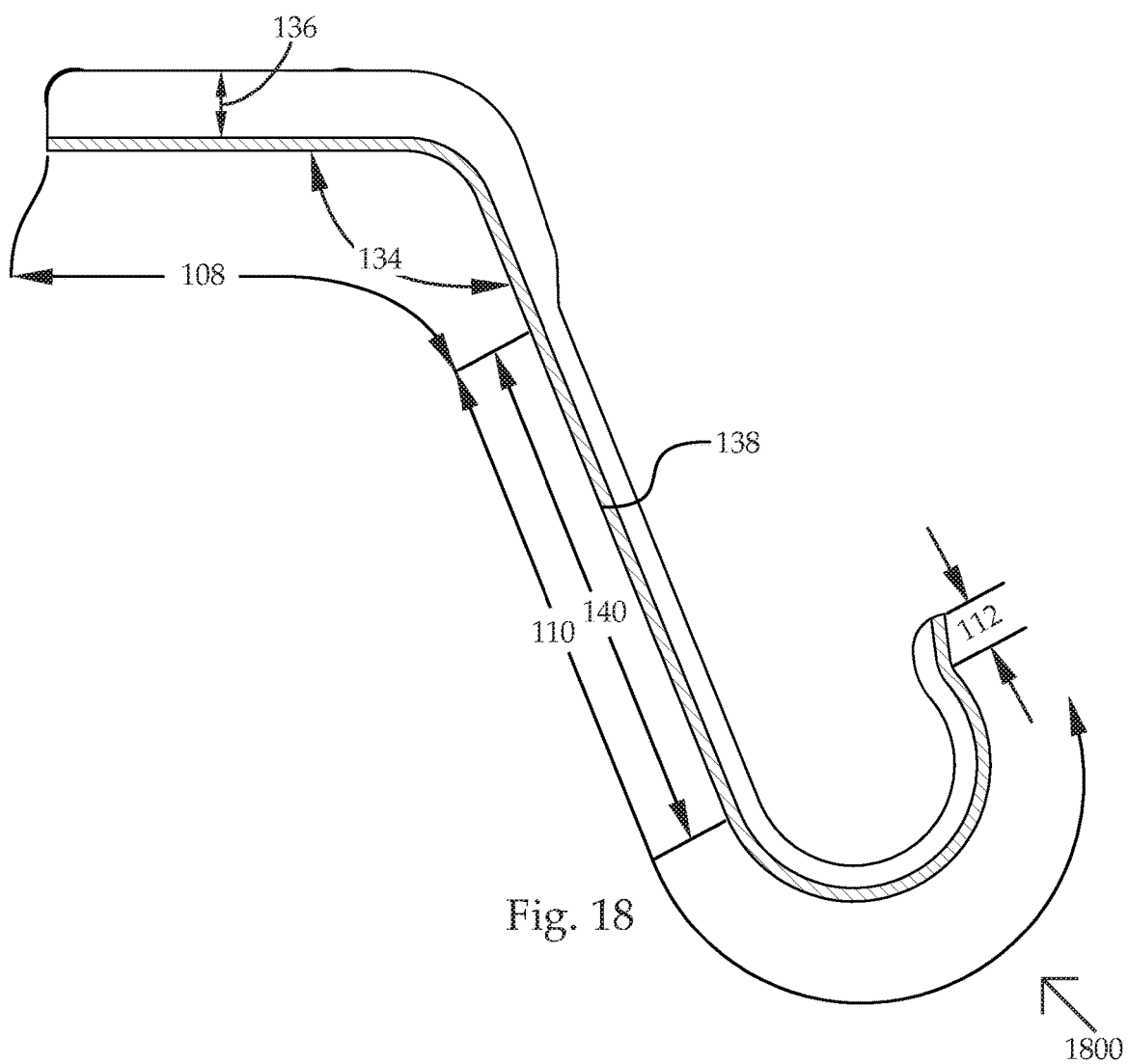
FIG. 18 is a side view of a hanger.

In some embodiments, as illustrated in FIG. 18, a substantially greater than 90 degree arc shape 134 of the load bearing, concave shaped flange 108 proximal to a receiving portion of the one or more receiving bracket apertures 106, as illustrated in FIG. 5.

In some embodiments, such as illustrated in FIG. 18, a substantially greater than 100 degree arc shape 134 of the load bearing, concave shaped flange 108 proximal to a receiving portion of the one or more receiving bracket apertures 106, as illustrated in FIG. 5. In one example, the load bearing, concave shaped flange 108 has a width 136 greater than approximately 2 times wider than a rim width 138 of a flange 140 about the trailing concave shaped, curved hanging structure 110.

In some embodiments, such as illustrated in FIG. 18, a substantially greater than 100 degree arc shape 134 of the load bearing, concave shaped flange 108 proximal to a receiving portion of the one or more receiving bracket apertures 106, e.g., as illustrated in FIG. 5. In one example, the load bearing, concave shaped flange 108 has a width 136 between an approximate range of 2 times to 4 times wider than a rim width 138 of a flange 140 about the trailing concave shaped, curved hanging structure 110 and that of the curved upward tip 112.

In some embodiments, a u-shaped curved, concave shaped hook section extended between the trailing concave shaped, curved hanging structure 110 and the curved upward tip 112.

In some embodiments, a load bearing, concave shaped flange 108 includes a load bearing, concave shaped rim having one or more spaced-apart tabs 114 about its outer surfaces 116, 118 or its inner surfaces 121, 122 of the load bearing, concave shaped flange 108 that attaches to the one or more receiving bracket apertures 106, e.g., as illustrated in FIGS. 1-5.

In some embodiments, as illustrated in FIG. 18, a load bearing, concave shaped flange 108 includes a load bearing, concave shaped rim having one or more spaced-apart tabs 114 about its outer surfaces 116, 118 or its inner surfaces 121, 122 of the load bearing, concave shaped flange 108 that attaches to the one or more receiving bracket apertures 106. In one example, the load bearing, concave shaped rim 136 is between an approximate range of 2 times to 6 times wider than a rim width 138 of a flange 140 about the trailing concave shaped, curved hanging structure 110 and that of the curved upward tip 112.

In some embodiments, as illustrated in FIG. 18, a load bearing, concave shaped flange 108 including a load bearing, concave shaped rim 136. In one example, the load bearing, concave shaped rim 136 is between an approximate range of 2 times to 6 times wider than a rim width 138 of a flange 140 about the trailing concave shaped, curved hanging structure 110 and that of the curved upward tip 112.

In another aspect, a hanger element 102 for an adapter bracket 101 for connecting a hanging item 105 to a wall mounted unit 100. The hanger element 102 includes a load bearing, concave shaped flange 108 that attaches to the adapter bracket 101 and a trailing concave shaped, curved hanging structure 110 extended from the load bearing, concave shaped flange 108.

In some embodiments, a curved upward tip 112 extended from the trailing concave shaped, curved hanging structure 110 that abuts the hanging item 105.

In some embodiments, the load bearing, concave shaped flange 108 includes a load bearing, concave shaped rim 136 having one or more spaced-apart tabs 114 about its outer surfaces 116, 118 or its inner surfaces 121, 122 of the load bearing, concave shaped flange 108 that attaches to the one or more receiving bracket apertures 106.

In some embodiments, a load bearing, concave shaped flange 108 includes a load bearing, concave shaped rim 136. In one example, the load bearing, concave shaped rim 136 is between an approximate range of 2 times to 6 times wider than a rim width 138 of a flange 140 about the trailing concave shaped, curved hanging structure 110 and that of the curved upward tip 112.

In some embodiments, a substantially greater than 100 degree arc shape 132 of the load bearing, concave shaped flange 108 proximal to a receiving portion of the one or more receiving bracket apertures 106. In one example, the load bearing, concave shaped flange 108 has a rim width 136 greater than approximately 2 times wider than a rim width 138 of a flange 140 about the trailing concave shaped, curved hanging structure 110.

Referring now to FIG. 28, a method 2800 is disclosed for assembling a wall mounted unit for attaching a hanging item 114 according to an embodiment of the present invention.

In method 2800, the method includes the steps:

connecting one or more first hang rails 103 in a horizontally or a vertically disposed position to a wall structure 100 (step 2802);

attaching one or more receiving bracket apertures 106 of one or more receiving brackets 101 to the one or more first hang rails 103 (step 2804); and attaching a load bearing, concave shaped flange 108 to the one or more receiving apertures 106 of the one or more receiving brackets 101 above a trailing concave shaped, curved hanging structure 110 extending from the load bearing, concave shaped flange 108 (step 2806)

In some embodiments, the load bearing, concave shaped flange 108 includes a load bearing, concave shaped rim 136 is between an approximate range of 2 times to 6 times wider than a rim width 138 of a flange 140 about the trailing concave shaped, curved hanging structure 110 and that of a curved upward tip 112 extended from the trailing concave shaped, curved hanging structure 110 that abuts the hanging item 105 (step 2808).

In some embodiments, the aching the load bearing, concaved shaped flange 108 includes at least one of:

attaching at least one slot about opposing sides of at least one of inner 121, 122 or outer surfaces 116, 118 of the load bearing, concave shaped flange 108 that attaches to the one or more receiving bracket apertures 106 of the one or more receiving brackets 101 (step 2810); and attaching at least one attachment structure about one or more opposing sides of at least one of inner 121, 122 or outer surfaces 116, 118 of the load bearing, concave shaped flange 108 that attaches to the one or more receiving bracket apertures 106 of the one or more receiving brackets 101 (step 2812).

It should be noted that step(s) 2808-2812 is/are optional steps and may not be implemented in all cases. Optional steps of method 2800 are illustrated using dotted lines in FIG. 28 so as to distinguish them from the other steps of method 2800.

It should be noted as herein described in the method, the steps and/or method of contemplated use can be carried out in many different ways, procedures, and the like according to, for example, one or more user preference(s). "[S]tep of" should not be interpreted as "step for", in the claims herein and is not intended to invoke the provisions of 35 U.S.C. § 112 ¶116.

Upon reading this specification, it should be appreciated that, under appropriate circumstances, considering such issues as user requirements or wishes, design considerations, marketing preferences, cost(s), structural requirement(s), available materials, technological advances, etc., other methods of use arrangements such as, for example, orders within above-mentioned list that are different, eliminated and/or additional steps, including or eliminating, for example, procedure, process, and/or maintenance step(s), etc., may be sufficient.

Many alterations and modifications may be made by those having ordinary skill in the art without departing from the spirit and scope of the invention. Therefore, it must be understood that the illustrated embodiments have been set forth only for the purposes of example and that they should not be taken as limiting the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use must be understood as being generic to all possible meanings supported by the specification and by the word itself.

The definitions of the words or elements therefore include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements or that a single element may be substituted for two or more elements. Although elements may be described above as acting in certain combinations, it is to be expressly understood that one or more elements from a certain combination can in some cases be excised from the combination and that the combination may be directed to a subcombination or variation of a subcombination.

Thus, specific embodiments and applications of storage systems for conveniently supporting and/or storing objects that employ at least one vertical rail and/or at least one horizontal track for supporting shelving brackets and/or other components have been disclosed. It should be apparent, however, to those skilled in the art that many more modifications besides those already described are possible without departing from the inventive concepts herein. Moreover, in interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the subject matter as viewed by a person with ordinary skill in the art, now known or later devised, are expressly contemplated as an equivalent. Therefore, obvious substitutions now or later known to one with ordinary skill in the art are defined to be within the scope of the defined elements.

We claim:

1. A hanger element for one or more receiving bracket apertures that, receives a hanging item, the hanger element comprising:
   a load bearing, concave shaped flange configured to attach to the one or more receiving bracket apertures wherein the load bearing, concave shaped flange comprises a first lateral side, and a second lateral side opposite the first lateral side;
   a trailing concave shaped, curved hanging structure extended from the load bearing, concave shaped flange;
   a first tab extended from the first lateral side of the load bearing, concave shaped flange;
   a second tab extended from the second lateral side of the load bearing, concave shaped flange; and
   wherein the first tab and the second tab are identical and symmetrically arranged.

2. The hanger element of claim 1, comprising a curved upward tip extended from the trailing concave shaped, curved hanging structure that is configured to abut to the received hanging item.

3. The hanger element of claim 1, comprising a third tab extended from the first lateral side of the loading bearing, concave shaped flange, and a fourth tab extended from the second lateral side of the loading bearing, concave shaped flange, wherein the third and fourth tabs are identical and symmetrically arranged.

4. The hanger element of claim 1, comprising an attachment structure disposed on a distal end of the first tab.

5. The hanger element of claim 1, comprising a substantially greater than 90 degree arc shape of the loading bearing, concave shaped flange.

6. The hanger element of claim 1, comprising a substantially greater than 100 degree arc shape of the load bearing, concave shaped flange.

7. The hanger element of claim 2, comprising a substantially greater than 100 degree arc shape of the load bearing, concave shaped flange.

8. A hanger element for an adapter bracket for connecting a hanging item to a wall mounted unit, the hanger element comprising:
   a load bearing, concave shaped flange that is configured to attach to the adapter bracket; wherein the loading bearing, concave shaped flange comprises a first lateral side, and a second lateral side opposite the first lateral side;
   a trailing concave shaped, curved hanging structure extended from the load bearing, concave shaped flange;
   a first tab extended from the first lateral side of the load bearing, concave shaped flange;
   a second tab extended from the second lateral side of the load bearing, concave shaped flange; wherein the first tab and the second tab are identical and symmetrically arranged.

9. The hanger element of claim 8, comprising a curved upward tip extended from the trailing concave shaped, curved hanging structure that is configured to abut the hanging item.

10. A hanger element of claim 8, comprising: a third tab extended from the first lateral side of the loading bearing, concave shaped flange, and a fourth tab extended from the second lateral side of the loading bearing, concave shaped flange, wherein the third and fourth tabs are identical and symmetrical arranged.

* * * * *